US010640420B2

(12) United States Patent
Amin et al.

(10) Patent No.: US 10,640,420 B2
(45) Date of Patent: *May 5, 2020

(54) STRENGTHENED GLASS WITH ULTRA DEEP DEPTH OF COMPRESSION

(71) Applicant: CORNING INCORPORATED, Corning, NY (US)

(72) Inventors: Jaymin Amin, Corning, NY (US); Benedict Osobomen Egboiyi, Painted Post, NY (US); Jonathan David Pesansky, Corning, NY (US); Kevin Barry Reiman, Horseheads, NY (US); Rostislav Vatchev Roussev, Painted Post, NY (US); Brian Paul Strines, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,004

(22) Filed: Nov. 6, 2018

(65) Prior Publication Data

US 2019/0071350 A1 Mar. 7, 2019

Related U.S. Application Data

(63) Continuation of application No. 14/926,425, filed on Oct. 29, 2015, now Pat. No. 10,150,698.

(51) Int. Cl.
*C03C 21/00* (2006.01)
*C03C 3/097* (2006.01)

(52) U.S. Cl.
CPC .......... *C03C 21/002* (2013.01); *C03C 3/097* (2013.01)

(58) Field of Classification Search
CPC ................. C03C 21/002; C03C 3/097
See application file for complete search history.

(56) References Cited

U.S. PATENT DOCUMENTS

| 3,433,611 | A | 3/1969 | Saunders et al. |
| 3,798,013 | A | 3/1974 | Inoue et al. |
| 3,936,287 | A | 2/1976 | Beall et al. |

(Continued)

FOREIGN PATENT DOCUMENTS

| CN | 102690059 | | 9/2012 |
| CN | 102815860 | A | 12/2012 |

(Continued)

OTHER PUBLICATIONS

International Search Report and Written Opinion PCT/US2016/034634 dated Nov. 2, 2016.

(Continued)

*Primary Examiner* — Shane Fang
(74) *Attorney, Agent, or Firm* — Jeffrey A. Schmidt

(57) ABSTRACT

Chemically strengthened glass articles having at least one deep compressive layer extending from a surface of the article to a depth of compression DOC of at least about 125 µm within the glass article. The compressive stress profile includes a single linear segment or portion extending from the surface to the depth of compression DOC. Alternatively, the compressive stress profile may include an additional portion extending from the surface to a relatively shallow depth and the linear portion extending from the shallow depth to the depth of compression.

18 Claims, 10 Drawing Sheets

(56) References Cited

U.S. PATENT DOCUMENTS

| | | | |
|---|---|---|---|
| 4,042,405 | A | 8/1977 | Krohn et al. |
| 4,726,981 | A | 2/1988 | Pierson et al. |
| 5,350,607 | A | 9/1994 | Tyson et al. |
| 5,773,148 | A | 6/1998 | Charrue et al. |
| 5,895,768 | A | 4/1999 | Speit |
| 6,111,821 | A | 8/2000 | Bach |
| 8,158,543 | B2 | 4/2012 | Dejneka et al. |
| 8,312,789 | B2 | 11/2012 | Beck |
| 8,349,455 | B2 | 1/2013 | Kondo et al. |
| 8,415,013 | B2 | 4/2013 | Barefoot et al. |
| 8,431,502 | B2 | 4/2013 | Dejneka et al. |
| 8,561,429 | B2 | 10/2013 | Allan et al. |
| 8,586,492 | B2 | 11/2013 | Barefoot et al. |
| 8,623,776 | B2 | 1/2014 | Dejneka et al. |
| 8,652,978 | B2 | 2/2014 | Dejneka et al. |
| 8,756,262 | B2 | 6/2014 | Zhang |
| 8,783,063 | B2 | 7/2014 | Osakabe et al. |
| 8,802,581 | B2 | 8/2014 | Dejneka et al. |
| 8,946,103 | B2 | 2/2015 | Dejneka et al. |
| 8,951,927 | B2 | 2/2015 | Dejneka et al. |
| 8,957,374 | B2 | 2/2015 | Liu et al. |
| 8,969,226 | B2 | 3/2015 | Dejneka et al. |
| 9,140,543 | B1 | 9/2015 | Allan et al. |
| 9,156,724 | B2 | 10/2015 | Gross |
| 9,290,407 | B2 | 3/2016 | Barefoot et al. |
| 9,290,413 | B2 | 3/2016 | Dejneka et al. |
| 2005/0250639 | A1 | 11/2005 | Sibers et al. |
| 2007/0060465 | A1 | 3/2007 | Varshneya et al. |
| 2009/0197088 | A1 | 8/2009 | Murata |
| 2010/0003508 | A1 | 1/2010 | Arrouy et al. |
| 2010/0028607 | A1 | 2/2010 | Lee et al. |
| 2010/0035038 | A1* | 2/2010 | Barefoot .......... C03C 3/064 428/220 |
| 2010/0087307 | A1 | 4/2010 | Murata et al. |
| 2010/0119846 | A1 | 5/2010 | Sawada |
| 2010/0210442 | A1 | 8/2010 | Abramov et al. |
| 2011/0014475 | A1 | 1/2011 | Murata |
| 2011/0165393 | A1 | 7/2011 | Bayne et al. |
| 2011/0226832 | A1 | 9/2011 | Bayne et al. |
| 2011/0281093 | A1 | 11/2011 | Gulati et al. |
| 2011/0294649 | A1 | 12/2011 | Gomez et al. |
| 2012/0052271 | A1 | 3/2012 | Gomez et al. |
| 2012/0052275 | A1 | 3/2012 | Hashimoto et al. |
| 2012/0135153 | A1 | 5/2012 | Osakabe et al. |
| 2012/0135226 | A1 | 5/2012 | Bookbinder et al. |
| 2012/0171497 | A1 | 7/2012 | Koyama et al. |
| 2012/0196110 | A1 | 8/2012 | Murata et al. |
| 2012/0219792 | A1 | 8/2012 | Yamamoto et al. |
| 2012/0308827 | A1 | 12/2012 | Boek et al. |
| 2012/0321898 | A1 | 12/2012 | Meinhardt et al. |
| 2013/0017380 | A1 | 1/2013 | Murata et al. |
| 2013/0045375 | A1 | 2/2013 | Gross |
| 2013/0101798 | A1 | 4/2013 | Hashimoto |
| 2013/0122260 | A1 | 5/2013 | Liang |
| 2013/0122284 | A1 | 5/2013 | Gross |
| 2013/0183512 | A1 | 7/2013 | Gy et al. |
| 2013/0202868 | A1 | 8/2013 | Barefoot et al. |
| 2013/0224492 | A1 | 8/2013 | Bookbinder et al. |
| 2013/0236666 | A1 | 9/2013 | Bookbinder et al. |
| 2013/0236699 | A1 | 9/2013 | Prest et al. |
| 2013/0240025 | A1 | 9/2013 | Bersano et al. |
| 2013/0309613 | A1 | 11/2013 | O'Malley et al. |
| 2014/0050911 | A1 | 2/2014 | Mauro et al. |
| 2014/0087159 | A1 | 3/2014 | Cleary et al. |
| 2014/0106172 | A1 | 4/2014 | Dejneka et al. |
| 2014/0113141 | A1 | 4/2014 | Yamamoto et al. |
| 2014/0139978 | A1 | 5/2014 | Kwong |
| 2014/0150525 | A1 | 6/2014 | Okawa et al. |
| 2014/0193606 | A1 | 7/2014 | Kwong |
| 2014/0227524 | A1 | 8/2014 | Ellison et al. |
| 2014/0370264 | A1 | 12/2014 | Ohara et al. |
| 2015/0011811 | A1 | 1/2015 | Pavone et al. |
| 2015/0030834 | A1 | 1/2015 | Morey et al. |
| 2015/0030838 | A1 | 1/2015 | Sellier et al. |
| 2015/0079398 | A1 | 3/2015 | Amin et al. |
| 2015/0132563 | A1 | 5/2015 | O'Malley et al. |
| 2015/0147575 | A1 | 5/2015 | Dejneka et al. |
| 2015/0183680 | A1 | 7/2015 | Barefoot et al. |
| 2015/0239775 | A1 | 8/2015 | Amin et al. |
| 2015/0239776 | A1 | 8/2015 | Amin et al. |
| 2015/0259244 | A1 | 9/2015 | Amin et al. |
| 2015/0368148 | A1 | 12/2015 | Duffy et al. |
| 2015/0368153 | A1 | 12/2015 | Pesansky et al. |
| 2016/0122240 | A1 | 5/2016 | Oram et al. |

FOREIGN PATENT DOCUMENTS

| | | |
|---|---|---|
| EP | 700879 | 3/1996 |
| EP | 2415724 | 2/2012 |
| GB | 1334828 | 10/1973 |
| JP | 2009099239 | 5/2009 |
| JP | 2010202514 | 9/2010 |
| JP | 2011213576 A | 10/2011 |
| WO | 2005091021 | 9/2005 |
| WO | 2011077756 | 6/2011 |
| WO | 2011149811 A1 | 12/2011 |
| WO | 2012126394 | 9/2012 |
| WO | 2013047679 A1 | 4/2013 |
| WO | 2013184205 | 12/2013 |
| WO | 2015127483 | 8/2015 |
| WO | 2016070048 A1 | 5/2016 |
| WO | 2016073539 A1 | 5/2016 |

OTHER PUBLICATIONS

Machine Translation of JP2017502188 Office Action dated Jul. 3, 2019, Japan Patent Office, 3 Pgs.

PCTUS2015041976 Search Report dated Oct. 29, 2015.

PCT/US2015/058322 Search Report dated Jan. 8, 2016.

Aegerter et al; "Sol-gel technologies for glass producers and users—Chapter 4.1.8—Scratch resistant coatings (G. Helsch and G. H. Frischat)", pp. 217-221, Kluwer Academic Publishers, 2004.

ASTM C1279-13 "Standard Test Method for Non-Destructive Photoelastic Measurement of Edge and Surface Stresses in Annealed, Heat-Strengthened, and Fully Tempered Flat Glass".

ASTM C1422/C1422M-10 "Standard Specification for Chemically Strengthened Flat Glass".

Bahlawane "Novel sol-gel process depositing a-Al2O3 for the improvement of graphite oxidation-resistance" Thin Solid Films, vol. 396, pp. 126-130, 2001.

Dessler et al; "Differences between films and monoliths of sol-gel derived aluminas", Thin Solid Films, vol. 519, pp. 42-51, 2010.

Fu et al, "Preparation of alumina films from a new sol-gel route" Thin Solid films 348, pp. 99-102 (1999).

Hauk "Sol-gel preparation of scratch-resistant Al2O3 coatings on float glass", Glass Science and Technology: Glastechnische Berichte, 72(12), pp. 386, 1999.

International Search Report and the Written Opinoin of the International Searching Authority; PCT/SU2015/035448; dated Sep. 18, 2015; 11 Pages.

International Search Report and the Written Opinoin of the International Searching Authority; PCT/US2015/023507 Search Report; 19 Pages.

International Search Report and the Written Opinoin of the International Searching Authority; PCT/US2015/034996 Search Report dated Jan. 4, 2016; 13 Pages.

International Search Report and the Written Opinoin of the International Searching Authority; PCT/US2015/058919 Search Report dated Jan. 11, 2016; 11 Pages.

International Search Report and the Written Opinoin of the International Searching Authority; PCT/US2015/058322; dated Jan. 8, 2016; 14 Pages.

Pflitsch et al; "Sol-gel deposition of chromium doped aluminum oxide films (Ruby) for surface temperature sensor application", Chem. Mater., vol. 20, pp. 2773-2778, 2008.

Stosser et al; "Magnetic Resonance investigation of the process of corundum formation starting from sol-gel precursors", J. Am. Ceram. Soc, vol. 88, No. 10, pp. 2913-2922, 2005.

(56) References Cited

OTHER PUBLICATIONS

Amin et al; U.S. Appl. No. 14/926,425, filed Oct. 29, 2015, titled "Strengthened Glass With Ultra-Deep Depth of Compression".
Oram et al; U.S. Appl. No. 14/932,411, filed Nov. 4, 2015, Titled "Deep Non-Frangible Stress Profiles and Methods of Making".
Japanese Patent Application No. 2017502202; Machine Translation of the Office Action dated Oct. 2, 2019; Japan Patent Office; 3 Pgs.

* cited by examiner

STRENGTHENED GLASS WITH ULTRA DEEP DEPTH OF COMPRESSION

This application is a continuation of U.S. application Ser. No. 14/926,425 filed on Oct. 29, 2015, which claims the benefit of priority under 35 U.S.C. § 119 of U.S. Provisional Application Ser. No. 62/073,252 filed on Oct. 31, 2014, the content of each is relied upon and incorporated herein by reference in its entirety.

BACKGROUND

The disclosure relates to a chemically strengthened glass article. More particularly, the disclosure relates to chemically strengthened glasses having a deep compressive surface layer.

Strengthened glasses are widely used in electronic devices as cover plates or windows for portable or mobile electronic communication and entertainment devices, such as cellular phones, smart phones, tablets, video players, information terminal (IT) devices, laptop computers and the like, as well as in other applications. As strengthened glasses are increasingly being utilized, it has become more important to develop strengthened glass materials having improved survivability, especially when subjected to tensile stresses and/or relatively deep flaws caused by contact with hard/sharp surfaces.

SUMMARY

Chemically strengthened glass articles having at least one deep compressive layer extending from a surface of the article to a depth of compression DOC of at least about 125 µm within the article are provided. In one embodiment, the compressive stress profile includes a single linear segment or portion extending from the surface to the depth of compression DOC. Alternatively, the compressive stress profile may include an additional portion extending from the surface to a relatively shallow depth and the linear portion extending from the shallow depth to the depth of compression.

Accordingly, one aspect of the disclosure is to provide a glass article having a thickness t and a compressive region under a compressive stress $CS_s$ of at least about 120 MPa at a surface of the glass article. The compressive region extends from the surface to a depth of compression DOC, wherein $0.1 \cdot t \leq DOC \leq 0.25 \cdot t$, and has a compressive stress profile. The compressive stress profile has a first portion a extending from the surface to a depth $d_a$ and a slope $m_a$, wherein the depth $d_a$ is equal to the depth of compression and $-0.4$ MPa/µm$\geq m_a \geq -3.0$ MPa/µm. In some embodiments, the portion a is linear or substantially linear.

Another aspect of the disclosure is to provide an alkali aluminosilicate glass comprising at least about 4 mol % $P_2O_5$ and from 0 mol % to about 4 mol % $B_2O_3$, wherein $1.3 < [(P_2O_5 + R_2O)/M_2O_3] \leq 2.3$, where $M_2O_3 = Al_2O_3 + B_2O_3$, and $R_2O$ is the sum of monovalent cation oxides present in the alkali aluminosilicate glass. The alkali aluminosilicate glass is ion exchanged and has thickness t and a compressive region. The compressive region has a compressive stress $CS_s$ in a range from about 100 MPa to about 400 MPa at a surface of the glass, and extends from the surface to a depth of compression DOC, wherein $0.1 \cdot t \leq DOC \leq 0.25 \cdot t$. The compressive region has a compressive stress profile. The compressive stress profile has a portion a extending from the surface to a depth $d_a$ and a slope $m_a$, wherein the depth $d_a$ is equal to the depth of compression DOC and $-0.4$ MPa/µm$\geq m_a \geq -3.0$ MPa/µm. In some embodiments, the portion a is linear or substantially linear.

Yet another aspect of the disclosure is to provide a glass article having a thickness t and a compressive region. The compressive region has a compressive stress $CS_s$ in a range from about 400 MPa to about 1200 MPa at a surface of the glass article, and extends from the surface to a depth of compression DOC, wherein $0.1 \cdot t \leq DOC \leq 0.25 \cdot t$. The compressive region has a compressive stress profile, the compressive stress profile comprising: a first portion b extending from the surface to a depth $d_b$ below the surface and having a slope $m_b$, wherein $-40$ MPa/µm$\geq m_b \geq -200$ MPa/µm; and a second substantially linear portion c extending from about $d_c$ to the depth of compression DOC and having a slope $m_c$, wherein $-0.4$ MPa/µm$\geq m_c - 3.0$ MPa/µm.

These and other aspects, advantages, and salient features will become apparent from the following detailed description, the accompanying drawings, and the appended claims.

DETAILED DESCRIPTION

Figure 1:
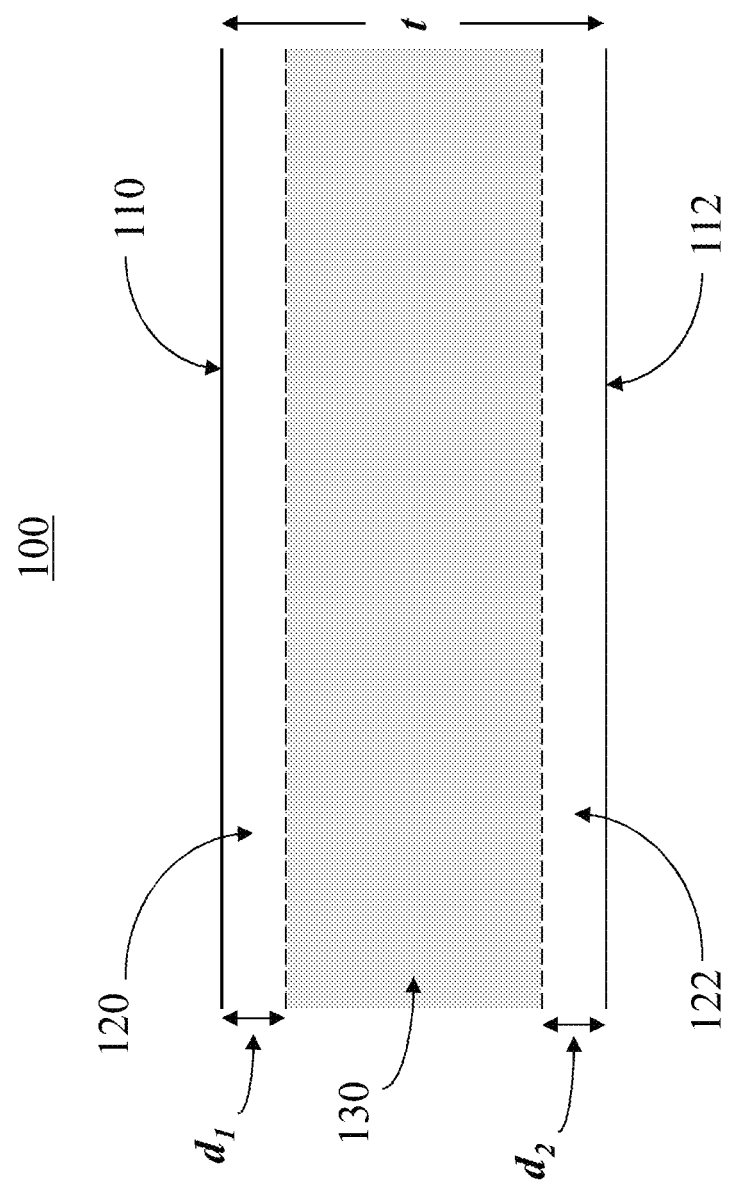
FIG. 1 is a schematic cross-sectional view of a chemically strengthened glass article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass article" and "glass articles" are used in their broadest sense to include any object made wholly or partly of glass. Unless otherwise specified, all glass compositions are expressed in terms of mole percent (mol %) and all ion exchange bath compositions are expressed in terms of weight percent (wt %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is "substantially free of MgO" is one in which MgO is not actively added or batched into the glass, but may be present in very small amounts as a contaminant; e.g., ≥0.1 mol %.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the terms "depth of layer" and "DOL" refer to the depth of the compressive layer as determined by surface stress meter (FSM) measurements using commercially available instruments such as the FSM-6000.

As used herein, the terms "depth of compression" and "DOC" refer to the depth at which the stress within the glass changes from compressive to tensile stress. At the DOC, the stress crosses from a positive (compressive) stress to a negative (tensile) stress and thus has a value of zero.

As described herein, compressive stress (CS) and central tension (CT) are expressed in terms of megaPascals (MPa), depth of layer (DOL) and depth of compression (DOC) are expressed in terms of microns (μm), where 1 μm=0.001 mm, and thickness t is expressed herein in terms of millimeters, where 1 mm=1000 μm, unless otherwise specified.

As used herein, the term "fracture," unless otherwise specified, means that a crack propagates across the entire thickness and/or entire surface of a substrate when that substrate is dropped or impacted with an object.

According to the scientific convention normally used in the art, compression is expressed as a negative (<0) stress and tension is expressed as a positive (>0) stress. Throughout this description, however, compressive stress CS is expressed as a positive or absolute value—i.e., as recited herein, CS=|CS| and central tension or tensile stress is expressed as a negative value in order to better visualize the compressive stress profiles described herein.

As used herein, the "slope (m)" refers to the slope of a segment or portion of the stress profile that closely approximates a straight line. The predominant slope is defined as the average slope for regions that are well approximated as straight segments. These are regions in which the absolute value of the second derivative of the stress profile is smaller than the ratio of the absolute value of the first derivative, and approximately half the depth of the region, as specified in equation (4) below. For a steep, shallow segment of the stress profile near the surface of the strengthened glass article, for example, the essentially straight segment is the portion for each point of which the absolute value of the second derivative of the stress profile is smaller than the absolute value of the local slope of the stress profile divided by the depth at which the absolute value of the stress changes by a factor of 2. Similarly, for a segment of the profile deeper within the glass, the straight portion of the segment is the region for which the local second derivative of the stress profile has an absolute value that is smaller than the absolute value of the local slope of the stress profile divided by half the DOC.

For typical stress profiles, this limit on the second derivative guarantees that the slope changes relatively slowly with depth, and is therefore reasonably well defined and can be used to define regions of slope that are important for the stress profiles that are considered advantageous for drop performance.

Let the stress as profile a function of depth x be given by the function $$\sigma = \sigma(x) \tag{1},$$

and let the first derivative of the stress profile with respect to depth be $$\sigma' = \frac{d\sigma}{dx}, \tag{2}$$

and the second derivative be $$\sigma'' = \frac{d^2\sigma}{dx^2}. \tag{3}$$

If a shallow segment extends approximately to a depth $d_s$, then for the purposes of defining a predominant slope, a straight portion of the profile is a region where $$|\sigma''(x)| < \left|2\frac{\sigma'(x)}{d_s}\right|. \tag{4}$$

If a deep segment extends approximately to a larger depth DOC, or to a larger depth $d_d$, or to a depth DOL in traditional terms, then a straight portion of the profile is a region where $$|\sigma''(x)| < \left|2\frac{\sigma'(x)}{d_d}\right| \approx \left|2\frac{\sigma'(x)}{DOC}\right| \approx \left|2\frac{\sigma'(x)}{DOL}\right|. \tag{5}$$

The latter equation is also valid for a 1-segment stress profile obtained by a single ion exchange in a salt containing only a single alkali ion other than the ion being replaced in the glass for chemical strengthening.

Preferably, the straight segments are selected as regions where $$|\sigma''(x)| < \left|2\frac{\sigma'(x)}{d}\right|, \quad (6)$$

where d stands for the relevant depth for the region, shallow or deep.

The slope m of linear segments of the compressive stress profiles described herein are given as absolute values of the slope $$\frac{d\sigma}{dx} \text{ - i.e., } m,$$

m, as recited herein, is equal to $$\left|\frac{d\sigma}{dx}\right|.$$

More specifically, the slope m represents the absolute value of the slope of a profile for which the compressive stress generally decreases as a function of increasing depth.

Described herein are glass articles that are chemically strengthened by ion exchange to obtain a prescribed compressive stress profile and thus achieve survivability when dropped onto a hard, abrasive surface from a prescribed height.

Compressive stress CS and depth of layer DOL are stress profile parameters that have been used for years to enable quality control of chemical strengthening. Compressive stress CS provides an estimate of the surface compression, an important parameter that correlates well with the amount of stress that needs to be applied to cause a failure of a glass article, particularly when the glass is free of substantially deep mechanical flaws. Depth of layer DOL has been used as an approximate measure of the depth of penetration of the larger (strengthening) cation (e.g., $K^+$ during $K^+$ for $Na^+$ exchange), with larger DOL correlating well with greater depths of the compression layer, protecting the glass by arresting deeper flaws, and preventing flaws from causing failure under conditions of relatively low externally applied stress.

Even with minor to moderate bending of a glass article, the bending moment induces a stress distribution that is generally linear with depth from the surface, having a maximum tensile stress on the outer side of bending, a maximum compressive stress on the inner side of the bending, and zero stress at the so-called neutral surface, which is usually in the interior. For tempered glass parts, this bending-induced constant-slope stress distribution is added to the tempering stress profile to result in the net stress profile in the presence of external (bending) stress.

The net profile in the presence of bending-induced stress generally has a different depth of compression DOC from the stress profile without bending. In particular, on the outer side of bending, the depth of compression DOC is reduced in the presence of bending. If the tempering stress profile has a relatively small stress slope at depths in the vicinity of and smaller than the DOC, the DOC can drop very substantially in the presence of bending. In the net stress profile, the tips of moderately deep flaws could be exposed to tension, while the same flaw tips would normally be arrested in the compression region of the tempering profile without bending. These moderately deep flaws can thus grow and lead to fracture during the bending.

Bending stresses are also important during drop testing. Regions of localized time-varying stress occur during mechanical vibrations and wave propagation through the glass article. With increasing drop height, the glass article experiences higher time-varying stresses during contact with the floor surface as well as during vibrations occurring after contact. Thus, some fracture failures may occur due to excessive post-contact tensile stress occurring at the tip of a relatively shallow flaw that would normally be innocuous in the presence of tempering without these time-varying stresses.

The present disclosure describes a range of slopes that provides a good trade-off between performance of the glass article during drop tests and during bending tests. The preferable ranges may in some cases be partially defined or limited by the capabilities and limitations of stress measurement equipment (such as, for example, the FSM-6000 stress meter) for collection and interpretation of spectra associated with these profiles for the purposes of quality control during production. Not only the depth of layer DOL, but also the slope of the stress profile (through the slope of the index profile associated with the stress profile), affect the ability to resolve particular lines in the coupling spectra, and thus to effectively control product quality.

Ion exchange is commonly used to chemically strengthen glasses. In one particular example, alkali cations within a source of such cations (e.g., a molten salt, or "ion exchange," bath) are exchanged with smaller alkali cations within the glass to achieve a layer that is under a compressive stress (CS) near the surface of the glass. For example, potassium ions from the cation source are often exchanged with sodium ions within the glass. The compressive layer extends from the surface to a depth within the glass.

A cross-sectional schematic view of a planar ion exchanged glass article is shown in FIG. 1. Glass article 100 has a thickness t, first surface 110, and second surface 112. In some embodiments, glass article 100 has a thickness t of at least 0.15 mm and up to about (i.e., less than or equal to) about 2.0 mm, or up to about 1.0 mm, or up to about 0.7 mm, or up to about 0.5 mm. While the embodiment shown in FIG. 1 depicts glass article 100 as a flat planar sheet or plate, glass article 100 may have other configurations, such as a three dimensional shape or another non-planar configurations. Glass article 100 has a first compressive region 120 extending from first surface 110 to a depth of compression (DOC) $d_1$ into the bulk of the glass article 100. In the embodiment shown in FIG. 1, glass article 100 also has a second compressive region 122 extending from second surface 112 to a second depth of compression (DOC) $d_z$. Glass article 100 also has a central region 130 that extends from $d_1$ to $d_z$. Central region 130 is under a tensile stress, having a maximum value at the center of the central region 130, referred to as central tension or center tension (CT). The tensile stress of region 130 balances or counteracts the compressive stresses CS of regions 120 and 122. The depths $d_1$, $d_2$ of first and second compressive regions 120, 122 protect the glass article 100 from the propagation of flaws introduced by sharp impact to first and second surfaces 110, 112 of glass article 100, while the compressive stress CS minimizes the likelihood of a flaw growing and penetrating through the depth $d_1$, $d_2$ of first and second compressive regions 120, 122.

The strengthened glass articles described herein have a maximum compressive stress $CS_s$ of at least about 150 megaPascals (MPa). In some embodiments, the maximum compressive stress $CS_s$ is at least about 100 MPa, in other embodiments, at least 140 MPa, and, in some embodiments, up to about 400 MPa. In some embodiments, the maximum compressive stress $CS_s$ is located at the surface (110, 112 in FIG. 1). In other embodiments, however, the maximum compressive $CS_s$ may be located in the compressive region (120, 122) at some depth below the surface of the glass article. Each compressive region (120, 122) extends from the surface of the glass article to a depth of compression DOC ($d_1$, $d_2$) of at least about 95 microns (μm) to about 250 μm. In some embodiments, DOC is in a range from about 100 μm and, in other embodiment, from about 140 μm to about 190 μm. The depth of compression DOC ($d_1$, $d_2$) may also be expressed in terms of the thickness t of the glass article 100. In some embodiments, $0.1 \cdot t \leq DOC \leq 0.25 \cdot t$, and, in other embodiments, $0.12 \cdot t \leq DOC \leq 0.22 \cdot t$.

Figure 2:
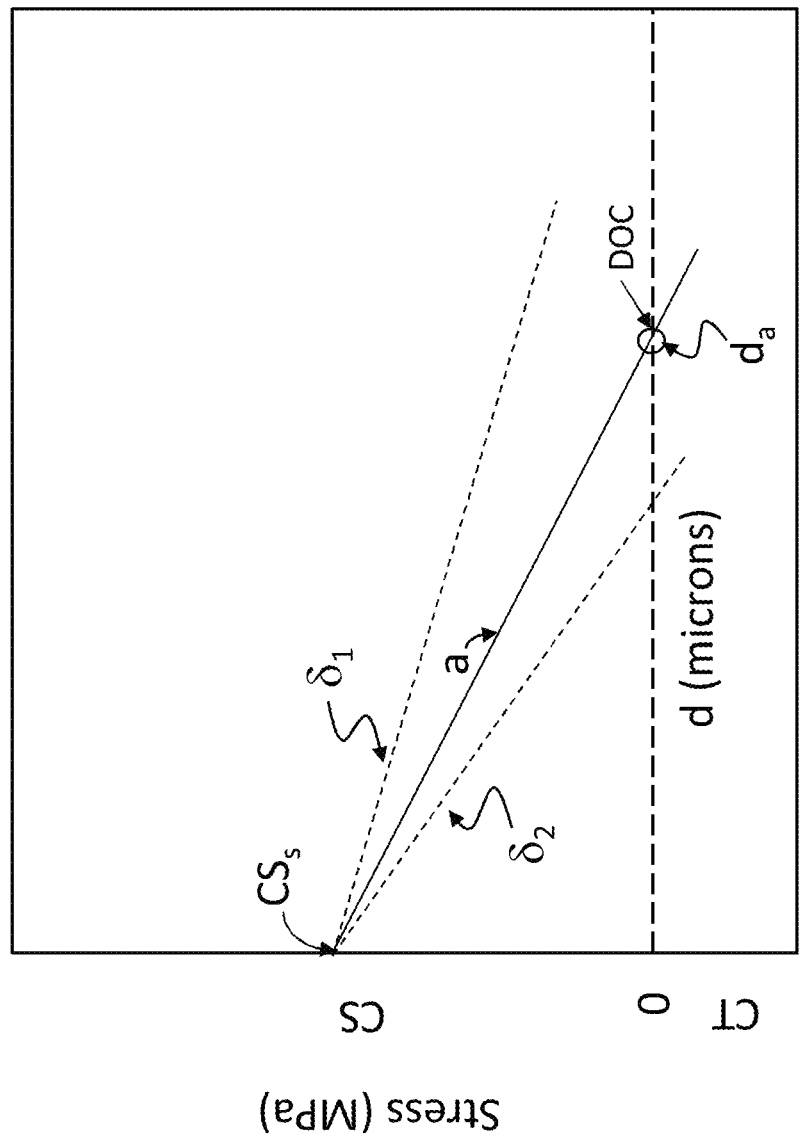
FIG. 2 is a schematic representation of a compressive stress profile obtained by a single step ion exchange process.

The compressive stress varies as a function of depth below the surface of the strengthened glass article, producing a compressive stress profile in the compressive region. In some embodiments, the compressive stress profile is substantially linear with respect to depth below the surface within the compression region, as schematically shown in FIG. 2. In FIG. 2, the compressive stress behaves substantially linearly with respect to depth below the surface, resulting in a straight line a having a slope $m_a$, expressed in MPa/μm, that intercepts the vertical y (CS) axis at $CS_s$. CS profile an intercepts the x axis at the depth of compression DOC. At this point, the total stress (tension+compression) is zero. Below DOC, the glass article is in tension CT, reaching a central value CT. In one non-limiting example, there may be a sub-region over which the tension varies from 0 up to a maximum (by absolute value) tension equal to CT, and a region over which the tension is substantially constant and equal to CT.

In some embodiments, the substantially linear portion of the compressive stress profile a of the glass article described herein has a slope $m_a$ that is within a specified range. In FIG. 2, for example, slope $m_a$ of line a lies between upper boundary $\delta_2$ and lower boundary $\delta_1$; i.e., $\delta_2 \leq m_a \leq \delta_1$. In some embodiments, slope $m_a$ is in a range from about −0.4 MPa/μm to about −3.0 MPa/μm. In some embodiments, −0.7 MPa/μm ≥ $m_a$ ≥ −2.7 MPa/μm, in other embodiments, −1.0 MPa/μm ≥ $m_a$ ≥ −2.0 MPa/μm and, in other embodiments, −1.5 MPa/μm ≥ $m_a$ ≥ −2.7 MPa/μm. When the slope $m_a$ has such values and the depth of compression DOC is at least about 95 μm, the resistance of the strengthened glass to at least one type of failure mode (e.g., very deep puncture) that may be prevalent in field failures of certain device designs is particularly advantageous.

Figure 3:
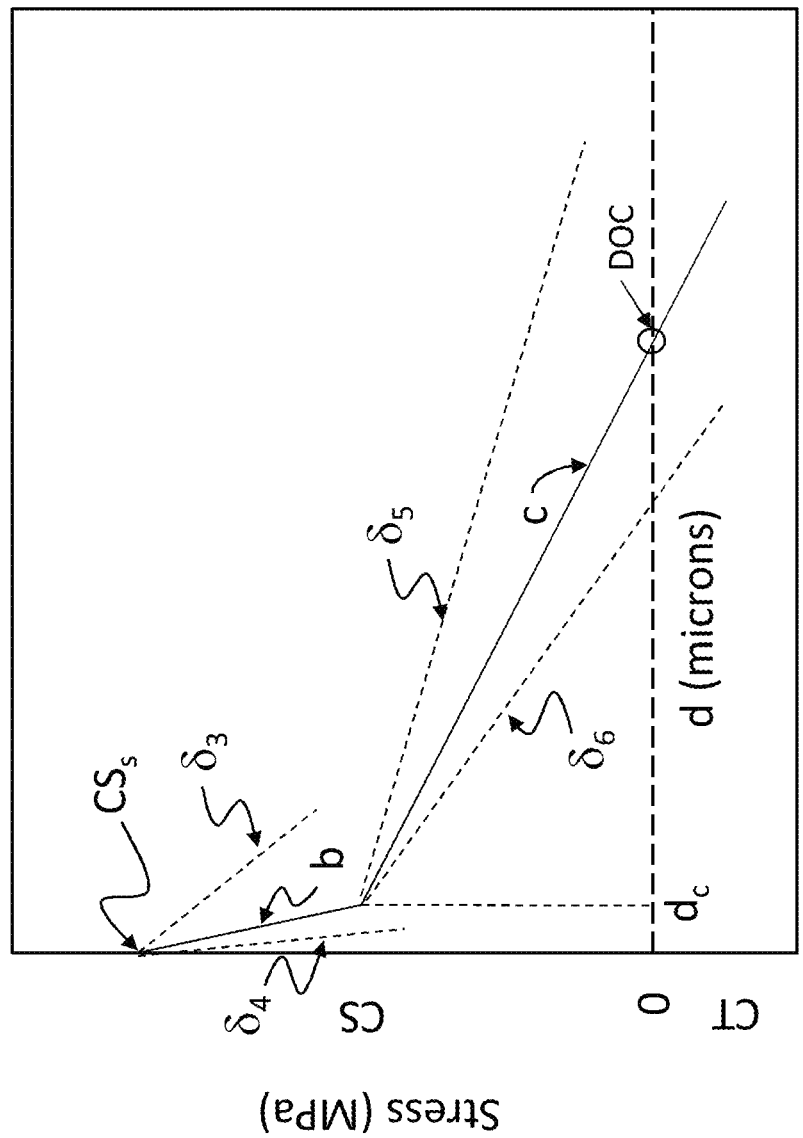
FIG. 3 is a graphical representation of a photograph showing strengthened glass articles 1) exhibiting frangible behavior upon fragmentation; and 2) exhibiting non-frangible behavior upon fragmentation.

In other embodiments, the compressive stress profile is a combination of more than one substantially linear function, as schematically shown in FIG. 3. As seen in FIG. 3, the compressive stress profile has a first segment or portion b and a second segment or portion c. First portion b exhibits substantially linear behavior from the strengthened surface of the glass article to a depth $d_b$. First portion b has a slope $m_b$ and y intercept $CS_s$. Second portion c of the compressive stress profile extends from approximately depth $d_b$ to the depth of compression DOC, and has a slope $m_c$. The compressive stress $CS(d_b)$ at depth $d_b$ is given by the expression $$CS(d_b) \approx CS_s - d_b(m_b) \qquad (7).$$

In some embodiments, depth $d_b$ is in a range from about 3 μm to about 8 μm; i.e., 3 μm ≤ $d_b$ ≤ 8 μm. In other embodiments, 3 μm ≤ $d_b$ ≤ 10 μm. In still other embodiments, 3 μm ≤ $d_b$ ≤ 15 μm.

It will be appreciated by those skilled in the art that the present disclosure is not limited to compressive stress profiles consisting of only two distinct portions. Instead, the compressive stress profile may include additional segments. In some embodiments, different linear portions or segments of the compressive stress profile may be joined by a transitional region (not shown) in which the slope of the profile transitions from a first slope to a second slope (e.g., from $m_b$ to $m_c$).

As shown in FIG. 3, the slope of portion b of the compressive stress profile is much steeper than the slope of portion b; i.e., $|m_b| \gg |m_c|$. This corresponds to a condition in which a compressive stress profile having a "spike" at the surface of the glass article is created by multiple ion exchange processes carried out in succession in order to provide the surface with sufficient compressive stress to withstand the introduction or growth of some flaws produced through impact.

In some embodiments, the compressive stress profiles b and c of the glass article described herein have slopes $m_b$ and $m_c$, respectively, that are within specified ranges. In FIG. 3, for example, slope $m_b$ of line/first portion b lies between upper boundary $\delta_3$ and lower boundary $\delta_4$ and slope $m_c$ of line/first portion c lies between upper boundary $\delta_5$ and lower boundary $\delta_6$; i.e., $\delta_3 \geq m_b \geq \delta_4$ and $\delta_5 \geq m_c \geq \delta_6$. In some embodiments, −40 MPa/μm ≤ $m_b$ ≤ −200 MPa/μm, and −0.7 MPa/μm ≤ $m_c$ ≤ −2.0 MPa/μm. In some embodiments, −40 MPa/μm ≤ $m_b$ ≤ −120 MPa/μm and, in some embodiments, −50 MPa/μm ≤ $m_b$ ≤ −120 MPa/μm. In some embodiments, slope $m_c$ is in a range from about −0.4 MPa/μm to about −3.0 MPa/μm. In some embodiments, −0.7 MPa/μm ≤ $m_c$ ≤ −2.7 MPa/μm, in other embodiments, −1.0 MPa/μm ≤ $m_c$ ≤ −2.0 MPa/μm and, in other embodiments, −1.5 MPa/μm ≤ $m_c$ ≤ −2.7 MPa/μm.

Compressive stress CS and depth of the compressive layer (referred to as "depth of layer" or DOL) are measured using those means known in the art. Such means include, but are not limited to, measurement of surface stress (FSM) using commercially available instruments such as the FSM-6000, manufactured by Luceo Co., Ltd. (Tokyo, Japan), or the like. Methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. The stress optical coefficient is in turn measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method.

The relationship between CS and central tension CT may, in some embodiments, be approximated by the expression:

$$CT = (CS \cdot DOL)/(t - 2DOL) \qquad (8),$$

where t is the thickness, expressed in microns (μm), of the glass article. In various sections of the disclosure, central tension CT and compressive stress CS are expressed herein in megaPascals (MPa), thickness t is expressed in either microns (μm) or millimeters (mm), and depth of layer DOL is expressed in microns (μm) or millimeters (mm), consistent with the representation of t.

For strengthened glass articles in which the compressive stress layers extend to deeper depths within the glass, the FSM technique may suffer from contrast issues which affect the observed DOL value. At deeper DOL values, there may be inadequate contrast between the TE and TM spectra, thus making the calculation of the difference between TE and TM spectra—and thus determining the DOL—more difficult. Moreover, the FSM software analysis is incapable of determining the compressive stress profile (i.e., the variation of compressive stress as a function of depth within the glass). In addition, the FSM technique is incapable of determining the depth of layer resulting from the ion exchange of certain elements such as, for example, ion exchange of sodium for lithium.

The DOL as determined by the FSM is a relatively good approximation for the depth of compression (DOC) when the DOL is a small fraction r of the thickness t and the index profile has a depth distribution with is reasonably well approximated with a simple linear truncated profile. When the DOL is a substantial fraction of the thickness, such as DOL≥0.1·t, then the DOC is most often noticeably lower than the DOL. For example, in the idealized case of a linear truncated profile, the relationship DOC=DOL (1−r) holds, where r=DOL/t.

Most TM and TE index profiles have a curved portion near the bottom of the index profile, and the relationship between DOC and DOL then may be somewhat more involved, but generally the ratio DOC/DOL decreases as r increases. For some profile shapes it is possible to have even DOC≥DOL, particularly when r<0.02.

When the concentration profile of the larger (strengthening) cation (e.g., $K^+$) introduced by ion exchange has two segments, with the segment one nearest the surface having a substantially higher concentration, and the segment spread over large depths and having a substantially lower concentration, the DOL as found by the FSM is significantly smaller than the overall depth of chemical penetration of the larger ion. This is in contrast with the case of a simple one-segment diffusion profile in which the DOL provides a good estimate of the chemical penetration. In a two-segment profile, the DOC may be larger or smaller than the DOL, depending on the depth and stress parameters of the profile and on the thickness.

When low external stresses are applied to a strengthened glass, the fracture-causing flaws have depths that correlate better with the DOC rather than the DOL. The reason why DOL has been used successfully as a high-value parameter of chemical strengthening is that for simple single-segment stress profiles, the DOL has had a good correlation with DOC. In addition, the DOC and the DOL have been similar, since for many years the DOL has been generally lower than 0.1·t, and for the most part lower than 0.05·t. Thus, for traditional chemically-strengthened glass, the DOL has had good correlation with the depth of strength-limiting flaws.

With the increasing importance of thinner cover glasses (e.g., having t<0.5 mm) and the introduction of deeper and more complex stress profiles aimed at improving drop performance while preserving high strength under high-stress tests such as ring-on-ring (ROR), abraded ring-on-ring (AROR), and four-point-bend (4PB), the depth of layer DOL deviates significantly from the depth of compression DOC. Fracture-inducing flaws under conditions of low external stress often occur at depths smaller than the DOL, but are consistent with the DOC.

The techniques described below have been developed to more accurately determine the depth of compression (DOC) and compressive stress profiles for strengthened glass articles.

In U.S. patent application Ser. No. 13/463,322, entitled "Systems And Methods for Measuring the Stress Profile of Ion-Exchanged Glass (hereinafter referred to as "Roussev I")," filed by Rostislav V. Roussev et al. on May 3, 2012, and claiming priority to U.S. Provisional Patent Application No. 61/489,800, having the same title and filed on May 25, 2011, two methods for extracting detailed and precise stress profiles (stress as a function of depth) of tempered or chemically strengthened glass are disclosed. The spectra of bound optical modes for TM and TE polarization are collected via prism coupling techniques and used in their entirety to obtain detailed and precise TM and TE refractive index profiles $n_{TM}(z)$ and $n_{TE}(z)$. In one embodiment, the detailed index profiles are obtained from the mode spectra by using the inverse Wentzel-Kramers-Brillouin (IWKB) method. The contents of the above applications are incorporated herein by reference in their entirety.

In another embodiment, the detailed index profiles are obtained by fitting the measured mode spectra to numerically calculated spectra of pre-defined functional forms that describe the shapes of the index profiles and obtaining the parameters of the functional forms from the best fit. The detailed stress profile S(z) is calculated from the difference of the recovered TM and TE index profiles by using a known value of the stress-optic coefficient (SOC):

$$S(z)=[n_{TM}(z)-n_{TE}(z)]/SOC \qquad (9).$$

Due to the small value of the SOC, the birefringence $n_{TM}(z)-n_{TE}(z)$ at any depth z is a relatively small fraction (typically on the order of 1%) of either of the indices $n_{TM}(z)$ and $n_{TE}(z)$. Obtaining stress profiles that are not significantly distorted due to noise in the measured mode spectra requires determination of the mode effective indices with precision on the order of 0.00001 RIU (refractive index units). The methods disclosed in Roussev I further include techniques applied to the raw data to ensure such high precision for the measured mode indices, despite noise and/or poor contrast in the collected TE and TM mode spectra or images of the mode spectra. Such techniques include noise-averaging, filtering, and curve fitting to find the positions of the extremes corresponding to the modes with sub-pixel resolution.

Similarly, U.S. patent application Ser. No. 14/033,954, entitled "Systems and Methods for Measuring Birefringence in Glass and Glass-Ceramics (hereinafter "Roussev II")," filed by Rostislav V. Roussev et al. on Sep. 23, 2013, and claiming priority to U.S. Provisional Application Ser. No. 61/706,891, having the same title and filed on Sep. 28, 2012, discloses apparatus and methods for optically measuring birefringence on the surface of glass and glass ceramics, including opaque glass and glass ceramics. Unlike Roussev I, in which discrete spectra of modes are identified, the methods disclosed in Roussev II rely on careful analysis of the angular intensity distribution for TM and TE light reflected by a prism-sample interface in a prism-coupling configuration of measurements. The contents of the above applications are incorporated herein by reference in their entirety.

In another disclosed method, derivatives of the TM and TE signals are determined after application of some combination of the aforementioned signal conditioning techniques. The locations of the maximum derivatives of the TM and TE signals are obtained with sub-pixel resolution, and the surface birefringence is proportional to the spacing of the above two maxima, with a coefficient determined as before by the apparatus parameters.

Associated with the requirement for correct intensity extraction, the apparatus comprises several enhancements, such as using a light-scattering surface (static diffuser) in close proximity to or on the prism entrance surface to improve the angular uniformity of illumination, a moving diffuser for speckle reduction when the light source is coherent or partially coherent, and light-absorbing coatings on portions of the input and output facets of the prism and on the side facets of the prism, to reduce parasitic background which tends to distort the intensity signal. In addition, the apparatus may include an infrared light source to enable measurement of opaque materials.

Furthermore, Roussev II discloses a range of wavelengths and attenuation coefficients of the studied sample, where measurements are enabled by the described methods and apparatus enhancements. The range is defined by $\alpha_s \lambda < 250 \pi \sigma_s$, where $\alpha_s$ is the optical attenuation coefficient at measurement wavelength $\lambda$, and $\sigma_s$ is the expected value of the stress to be measured with typically required precision for practical applications. This wide range allows measurements of practical importance to be obtained at wavelengths where the large optical attenuation renders previously existing measurement methods inapplicable. For example, Roussev II discloses successful measurements of stress-induced birefringence of opaque white glass-ceramic at a wavelength of 1550 nm, where the attenuation is greater than about 30 dB/mm.

While it is noted above that there are some issues with the FSM technique at deeper DOL values, FSM is still a beneficial conventional technique which may utilized with the understanding that an error range of up to +/−20% is possible at deeper DOL values. The terms "depth of layer" and "DOL" as used herein refer to DOL values computed using the FSM technique, whereas the terms "depth of compression" and "DOC" refer to depths of the compressive layer determined by the methods described in Roussev I & II.

As stated above, the glass articles may be chemically strengthened by ion exchange. In this process, ions at or near the surface of the glass are replaced by—or exchanged with—larger ions usually having the same valence or oxidation state. In those embodiments in which the glass article comprises, consists essentially of, or consists of an alkali aluminosilicate glass, ions in the surface layer of the glass and the larger ions are monovalent alkali metal cations, such as $Na^+$ (when $Li^+$ is present in the glass), $K^+$, $Rb^+$, and $Cs^+$. Alternatively, monovalent cations in the surface layer may be replaced with monovalent cations other than alkali metal cations, such as $Ag^+$ or the like.

Ion exchange processes are typically carried out by immersing a glass article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass that result from the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass is immersed in multiple ion exchange baths, with washing and/or annealing steps between immersions, are described in U.S. Pat. No. 8,561,429, by Douglas C. Allan et al., issued on Oct. 22, 2013, entitled "Glass with Compressive Surface for Consumer Applications," and claiming priority from U.S. Provisional Patent Application No. 61/079,995, filed Jul. 11, 2008, in which glass is strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass is strengthened by ion exchange in a first bath is diluted with an effluent ion, followed by immersion in a second bath having a smaller concentration of the effluent ion than the first bath. The contents of U.S. Pat. Nos. 8,561,429 and 8,312,739 are incorporated herein by reference in their entirety.

The compressive stress is created by chemically strengthening the glass article, for example, by the ion exchange processes previously described herein, in which a plurality of first metal ions in the outer region of the glass article is exchanged with a plurality of second metal ions so that the outer region comprises the plurality of the second metal ions. Each of the first metal ions has a first ionic radius and each of the second alkali metal ions has a second ionic radius. The second ionic radius is greater than the first ionic radius, and the presence of the larger second alkali metal ions in the outer region creates the compressive stress in the outer region.

At least one of the first metal ions and second metal ions are ions of an alkali metal. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion.

In some embodiments, the glass is strengthened in a single ion exchange step to produce the compressive stress profile shown in FIG. 2. Typically, the glass is immersed in a molten salt bath containing a salt of the larger alkali metal cation. In some embodiments, the molten salt bath contains or consists essentially of salts of the larger alkali metal cation. However, small amounts—in some embodiments, less that about 10 wt %, in some embodiments, less than about 5 wt %, and, in other embodiments less than about 2 wt %—of salts of the smaller alkali metal cation may be present in the bath. In other embodiments, salts of the smaller alkali metal cation may comprise at least about 30 wt %, or at least about 40 wt %, or from about 40 wt % to about 75 wt % of the ion exchange bath. This single ion exchange process may take place at a temperature of at least about 400° C. and, in some embodiments, at least about 440° C., for a time sufficient to achieve the desired depth of compression DOC. In some embodiments, the single step ion exchange process may be conducted for at least eight hours, depending on the composition of the bath.

In another embodiment, the glass is strengthened in a two-step or dual ion exchange method to produce the compressive stress profile shown in FIG. 3. The first step of the process, the glass is ion exchanged in the first molten salt bath described above. After completion of the first ion exchange, the glass is immersed in a second ion exchange bath. The second ion exchange bath is different—i.e., separate from and, in some embodiments, having a different composition—from the first bath. In some embodiments, the second ion exchange bath contains only salts of the larger alkali metal cation, although, in some embodiments small amounts of the smaller alkali metal cation (e.g., ≤2 wt %; ≤3 wt %) may be present in the bath. in addition, the immersion time and temperature of the second ion exchange step may differ from those of the first ion exchange step. In some embodiments, the second ion exchange step is carried out at a temperature of at least about 350° C. and, in other embodiments, at least about 380° C. The duration of the second ion exchange step is sufficient to achieve the desired depth $d_a$ of the shallow segment, in some embodiments, may be 30 minutes or less. In other embodiments, the duration is 15 minutes or less and, in some embodiments, in a range from about 10 minutes to about 60 minutes.

The second ion exchange bath is different than the first ion exchange bath, because the second ion exchange step is directed to delivering a different concentration of the larger cation or, in some embodiments, a different cation altogether, to the alkali aluminosilicate glass article than the first ion exchange step. In one or more embodiments, the second ion exchange bath may comprise at least about 95% by weight of a potassium composition that delivers potassium ions to the alkali aluminosilicate glass article. In a specific embodiment, the second ion exchange bath may comprise from about 98% to about 99.5% by weight of the potassium composition. While it is possible that the second ion exchange bath only comprises at least one potassium salt, the second ion exchange bath may, in further embodiments, comprise 0-5% by weight, or about 0.5-2.5% by weight of at least one sodium salt, for example, $NaNO_3$. In an exemplary embodiment, the potassium salt is $KNO_3$. In further embodiments, the temperature of the second ion exchange step may be 380° C. or greater.

The purpose of the second ion exchange step is to form a "spike" increase the compressive stress in the region immediately adjacent to the surface of the glass article, as represented by portion b of the stress profile shown in FIG. 3.

The glass articles described herein may comprise or consist essentially of any glass that is chemically strengthened by ion exchange. In some embodiments, the glass is an alkali aluminosilicate glass.

In one embodiment, the alkali aluminosilicate glass comprises or consists essentially of at least one of alumina and boron oxide, and at least one of an alkali metal oxide and an alkali earth metal oxide, wherein $-15$ mol %≤($R_2O+R'O-Al_2O_3-ZrO_2$)$-B_2O_3$≤4 mol %, where R is one of Li, Na, K, Rb, and Cs, and R' is at least one of Mg, Ca, Sr, and Ba. In some embodiments, the alkali aluminosilicate glass comprises or consists essentially of: from about 62 mol % to about 70 mol. % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. In some embodiments, the glass comprises alumina and boron oxide and at least one alkali metal oxide, wherein $-15$ mol %≤($R_2O+R'O-Al_2O_3-ZrO_2$)$-B_2O_3$≤4 mol %, where R is at least one of Li, Na, K, Rb, and Cs, and R' is at least one of Mg, Ca, Sr, and Ba; wherein 10≤$Al_2O_3+B_2O_3+ZrO_2$≤30 and 14≤$R_2O+R'$≤25; wherein the silicate glass comprises or consists essentially of: 62-70 mol. % $SiO_2$; 0-18 mol % $Al_2O_3$; 0-10 mol % $B_2O_3$; 0-15 mol % $Li_2O$; 6-14 mol % $Na_2O$; 0-18 mol % $K_2O$; 0-17 mol % MgO; 0-18 mol % CaO; and 0-5 mol % $ZrO_2$. The glass is described in U.S. patent application Ser. No. 12/277,573 filed Nov. 25, 2008, by Matthew J. Dejneka et al., and entitled "Glasses Having Improved Toughness And Scratch Resistance," and U.S. Pat. No. 8,652,978 filed Aug. 17, 2012, by Matthew J. Dejneka et al., and entitled "Glasses Having Improved Toughness And Scratch Resistance," both claiming priority to U.S. Provisional Patent Application No. 61/004,677, filed on Nov. 29, 2008. The contents of all of the above are incorporated herein by reference in their entirety.

In another embodiment, the alkali aluminosilicate glass comprises or consists essentially of: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $Sb_2O_3$; wherein 12 mol %≤$Li_2O+Na_2O+K_2O$≤20 mol % and 0 mol %≤$MgO+CaO$≤10 mol %. In some embodiments, the alkali aluminosilicate glass comprises or consists essentially of: 60-70 mol % $SiO_2$; 6-14 mol % $Al_2O_3$; 0-3 mol % $B_2O_3$; 0-1 mol % $Li_2O$; 8-18 mol % $Na_2O$; 0-5 mol % $K_2O$; 0-2.5 mol % CaO; greater than 0 mol % to 3 mol % $ZrO_2$; 0-1 mol % $SnO_2$; and 0-1 mol % $CeO_2$, wherein 12 mol %<$Li_2O+Na_2O+K_2O$≤20 mol %, and wherein the silicate glass comprises less than 50 ppm $As_2O_3$. In some embodiments, the alkali aluminosilicate glass comprises or consists essentially of: 60-72 mol % $SiO_2$; 6-14 mol % $Al_2O_3$; 0-3 mol % $B_2O_3$; 0-1 mol % $Li_2O$; 0-20 mol % $Na_2O$; 0-10 mol % $K_2O$; 0-2.5 mol % CaO; 0-5 mol % $ZrO_2$; 0-1 mol % $SnO_2$; and 0-1 mol % $CeO_2$, wherein 12 mol %≤$Li_2O+Na_2O+K_2O$≤20 mol %, and wherein the silicate glass comprises less than 50 ppm $As_2O_3$ and less than 50 ppm $Sb_2O_3$. The glass is described in U.S. Pat. No. 8,158,543 by Sinue Gomez et al., entitled "Fining Agents for Silicate Glasses," filed on Feb. 25, 2009; U.S. Pat. No. 8,431,502 by Sinue Gomez et al., entitled "Silicate Glasses Having Low Seed Concentration," filed Jun. 13, 2012; and U.S. Pat. No. 8,623,776, by Sinue Gomez et al., entitled "Silicate Glasses Having Low Seed Concentration," filed Jun. 19, 2013, all of which claim priority to U.S. Provisional Patent Application No. 61/067,130, filed on Feb. 26, 2008. The contents of all of the above are incorporated herein by reference in their entirety.

In another embodiment, the alkali aluminosilicate glass comprises $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises or consists essentially of: from about 61 mol % to about 75 mol % $SiO_2$; from about 7 mol % to about 15 mol % $Al_2O_3$; from 0 mol % to about 12 mol % $B_2O_3$; from about 9 mol % to about 21 mol % $Na_2O$; from 0 mol % to about 4 mol % $K_2O$; from 0 mol % to about 7 mol % MgO; and from 0 mol % to about 3 mol % CaO. The glass is described in U.S. Pat. No. 8,802,581 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009.

The contents of the above patent and application are incorporated herein by reference in their entirety.

In another embodiment, the alkali aluminosilicate glass comprises at least 50 mol % $SiO_2$ and at least one modifier selected from the group consisting of alkali metal oxides and alkaline earth metal oxides, wherein [($Al_2O_3$ (mol %)+$B_2O_3$ (mol %))/($\Sigma$ alkali metal modifiers (mol %))]>1. In some embodiments, the alkali aluminosilicate glass comprises or consists essentially of: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. In some embodiments, the glass comprises or consists essentially of: at least 58 mol % $SiO_2$; at least 8 mol % $Na_2O$; from 5.5 mol % to 12 mol % $B_2O_3$; and $Al_2O_3$, wherein [($Al_2O_3$ (mol %)+$B_2O_3$ (mol %))/($\Sigma$ alkali metal modifiers (mol %))]>1, $Al_2O_3$ (mol %)>$B_2O_3$ (mol %), 0.9<$R_2O/Al_2O_3$<1.3. The glass is described in U.S. Pat. No. 8,586,492, entitled "Crack And Scratch Resistant Glass and Enclosures Made Therefrom," filed Aug. 18, 2010, by Kristen L. Barefoot et al., and U.S. patent application Ser. No. 14/082,847, entitled "Crack And Scratch Resistant Glass and Enclosures Made Therefrom," filed Nov. 18, 2013, by Kristen L. Barefoot et al., both claiming priority to U.S. Provisional Patent Application No. 61/235,767, filed on Aug. 21, 2009. The contents of all of the above are incorporated herein by reference in their entirety.

In another embodiment, the alkali aluminosilicate glass comprises $SiO_2$, $Al_2O_3$, $P_2O_5$, and at least one alkali metal oxide ($R_2O$), wherein $0.75 \leq [(P_2O_5 \text{ (mol \%)}+R_2O \text{ (mol \%)})/M_2O_3 \text{ (mol \%)}] \leq 1.2$, where $M_2O_3=Al_2O_3+B_2O_3$. In some embodiments, the alkali aluminosilicate glass comprises or consists essentially of: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$ and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12 mol % $P_2O_5$; and from about 12 mol % to about 16 mol % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010. The contents of the above applications are incorporated herein by reference in their entirety.

In still another embodiment, the alkali aluminosilicate glass comprises at least about 50 mol % $SiO_2$ and at least about 11 mol % $Na_2O$, and has a surface compressive stress of at least about 900 MPa. In some embodiments, the glass further comprises $Al_2O_3$ and at least one of $B_2O_3$, $K_2O$, MgO and ZnO, wherein $-340+27.1.Al_2O_3-28.7.B_2O_3+15.6.Na_2O-61.4.K_2O+8.1.(MgO+ZnO) \geq 0$ mol %. In particular embodiments, the glass comprises or consists essentially of: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. patent application Ser. No. 13/533,298, by Matthew J. Dejneka et al., entitled "Ion Exchangeable Glass with High Compressive Stress," filed Jun. 26, 2012, and claiming priority to U.S. Provisional Patent Application No. 61/503,734, filed Jul. 1, 2011. The contents of the above applications are incorporated herein by reference in their entirety.

In other embodiments, the alkali aluminosilicate glass is ion exchangeable and comprises: at least about 50 mol % $SiO_2$; at least about 10 mol % $R_2O$, wherein $R_2O$ comprises $Na_2O$; $Al_2O_3$; and $B_2O_3$, wherein $B_2O_3$—($R_2O$—$Al_2O_3$)$\geq$3 mol %. In some embodiments, the glass comprises: at least about 50 mol % $SiO_2$; at least about 10 mol % $R_2O$, wherein $R_2O$ comprises $Na_2O$; $Al_2O_3$, wherein $Al_2O_3$ (mol %)<$R_2O$ (mol %); and from 3 mol 5 to 4.5 mol % $B_2O_3$, wherein $B_2O_3$ (mol %)−($R_2O$ (mol %)−$Al_2O_3$ (mol %))$\geq$3 mol %. In certain embodiments, the glass comprises or consists essentially of: at least about 50 mol % $SiO_2$; from about 9 mol % to about 22 mol % $Al_2O_3$; from about 3 mol % to about 10 mol % $B_2O_3$; from about 9 mol % to about 20 mol % $Na_2O$; from 0 mol % to about 5 mol % $K_2O$; at least about 0.1 mol % MgO, ZnO, or combinations thereof, wherein 0$\leq$MgO$\leq$6 and 0$\leq$ZnO$\leq$6 mol %; and, optionally, at least one of CaO, BaO, and SrO, wherein 0 mol %$\leq$CaO+SrO+BaO$\leq$2 mol %. When ion exchanged, the glass, in some embodiments, has a Vickers crack initiation threshold of at least about 10 kgf. Such glasses are described in U.S. patent application Ser. No. 14/197,658, filed May 28, 2013, by Matthew J. Dejneka et al., entitled "Zircon Compatible, Ion Exchangeable Glass with High Damage Resistance," which is a continuation of U.S. patent application Ser. No. 13/903,433, filed May 28, 2013, by Matthew J. Dejneka et al., entitled "Zircon Compatible, Ion Exchangeable Glass with High Damage Resistance," both claiming priority to Provisional Patent Application No. 61/653,489, filed May 31, 2012. The contents of these applications are incorporated herein by reference in their entirety.

In some embodiments, the glass comprises: at least about 50 mol % $SiO_2$; at least about 10 mol % $R_2O$, wherein $R_2O$ comprises $Na_2O$; $Al_2O_3$, wherein −0.5 mol %$\leq$$Al_2O_3$ (mol %)−$R_2O$ (mol %)$\leq$2 mol %; and $B_2O_3$, and wherein $B_2O_3$ (mol %)−($R_2O$ (mol %)−$Al_2O_3$ (mol %))$\geq$4.5 mol %. In other embodiments, the glass has a zircon breakdown temperature that is equal to the temperature at which the glass has a viscosity of greater than about 40 kPoise and comprises: at least about 50 mol % $SiO_2$; at least about 10 mol % $R_2O$, wherein $R_2O$ comprises $Na_2O$; $Al_2O_3$; and $B_2O_3$, wherein $B_2O_3$ (mol %)−($R_2O$ (mol %)−$Al_2O_3$ (mol %))$\geq$4.5 mol %. In still other embodiments, the glass is ion exchanged, has a Vickers crack initiation threshold of at least about 30 kgf, and comprises: at least about 50 mol % $SiO_2$; at least about 10 mol % $R_2O$, wherein $R_2O$ comprises $Na_2O$; $Al_2O_3$, wherein −0.5 mol %$\leq$$Al_2O_3$ (mol %)−$R_2O$ (mol %)$\leq$2 mol %; and $B_2O_3$, wherein $B_2O_3$ (mol %)−($R_2O$ (mol %)−$Al_2O_3$ (mol %))$\geq$4.5 mol %. Such glasses are described in U.S. patent application Ser. No. 13/903,398, by Matthew J. Dejneka et al., entitled "Ion Exchangeable Glass with High Damage Resistance," filed May 28, 2013, claiming priority from U.S. Provisional Patent Application No. 61/653,485, filed May 31, 2012. The contents of these applications are incorporated herein by reference in their entirety.

In certain embodiments, the alkali aluminosilicate glass comprises at least about 4 mol % $P_2O_5$, wherein ($M_2O_3$ (mol %)/$R_xO$ (mol %))<1, wherein $M_2O_3=Al_2O_3+B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$. In some embodiments, the glass is ion exchanged to a depth of layer of at least about 10 μm and comprises at least about 4 mol % $P_2O_5$, wherein 0.6<[$M_2O_3$ (mol %)/$R_xO$ (mol %)]<1.4 or $1.3<[(P_2O_5+R_2O)/M_2O_3]\leq2.3$, where $M_2O_3=Al_2O_3+B_2O_3$, $R_xO$ is the sum of monovalent and divalent cation oxides present in the alkali aluminosilicate glass, and $R_2O$ is the sum of monovalent cation oxides present in the alkali aluminosilicate glass. In one embodiment, the glass comprises at least about 4 mol % $P_2O_5$ and from 0 mol % to about 4 mol % $B_2O_3$, wherein $1.3<[(P_2O_5+R_2O)/M_2O_3]\leq2.3$, where $M_2O_3=Al_2O_3+B_2O_3$, and $R_2O$ is the sum of monovalent cation oxides present in the alkali aluminosilicate glass. In some embodiments, the glass is lithium-free and consists essentially of from about 40 mol % to about 70 mol % $SiO_2$; from about 11 mol % to about 25 mol % $Al_2O_3$; from about 4 mol % to about 15 mol % $P_2O_5$; from about 13 mol % to about 25 mol % $Na_2O$; from about 13 to about 30 mol % $R_xO$, where wherein $R_xO$ is the sum of the alkali metal oxides, alkaline earth metal oxides, and transition metal monoxides present in the glass; from about 11 to about 30 mol % $M_2O_3$, where $M_2O_3=Al_2O_3+B_2O_3$; from 0 mol % to about 1 mol % $K_2O$; from 0 mol % to about 4 mol % $B_2O_3$, and 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br; the glass is lithium-free; and $1.3<[(P_2O_5+R_2O)/M_2O_3]\leq2.3$, where $R_2O$ is the sum of monovalent cation oxides present in the glass. The glass is described in U.S. patent application Ser. No. 13/678,013 by Timothy M. Gross, entitled "Ion Exchangeable Glass with High Crack Initiation Threshold," filed Nov. 15, 2012, and U.S. Pat. No. 8,756,262 by Timothy M. Gross, entitled "Ion Exchangeable Glass with High Crack Initiation Threshold," filed Nov. 15, 2012, both claiming priority to U.S. Provisional Patent Application No. 61/560,434 filed Nov. 16, 2011. The contents of the above patent and patent application are incorporated herein by reference in their entirety.

In other embodiments, the alkali aluminosilicate glass comprises: from about 50 mol % to about 72 mol % $SiO_2$; from about 12 mol % to about 22 mol % $Al_2O_3$; up to about 15 mol % $B_2O_3$; up to about 1 mol % $P_2O_5$; from about 11 mol % to about 21 mol % $Na_2O$; up to about 5 mol % $K_2O$; up to about 4 mol % MgO; up to about 5 mol % ZnO; and up to about 2 mol % CaO. In some embodiments, the glass comprises: from about 55 mol % to about 62 mol % $SiO_2$; from about 16 mol % to about 20 mol % $Al_2O_3$; from about 4 mol % to about 10 mol % $B_2O_3$; from about 14 mol % to about 18 mol % $Na_2O$; from about 0.2 mol % to about 4 mol % $K_2O$; up to about 0.5 mol % MgO; up to about 0.5 mol % ZnO; and up to about 0.5 mol % CaO, wherein the glass is substantially free of $P_2O_5$. In some embodiments, $Na_2O+K_2O—Al_2O_3\leq2.0$ mol % and, in certain embodiments $Na_2O+K_2O—Al_2O_3\leq0.5$ mol %. In some embodiments, $B_2O_3—(Na_2O+K_2O—Al_2O_3)>4$ mol % and, in certain embodiments, $B_2O_3—(Na_2O+K_2O—Al_2O_3)>1$ mol %. In some embodiments, 24 mol % $\leq RAlO_4\leq45$ mol %, and, in other embodiments, 28 mol % $\leq RAlO_4\leq45$ mol %, where R is at least one of Na, K, and Ag. The glass is described in U.S. Provisional Patent Application No. 61/909,049 by Matthew J. Dejneka et al., entitled "Fast Ion Exchangeable Glasses with High Indentation Threshold," filed Nov. 26, 2013, the contents of which are incorporated herein by reference in their entirety.

In some embodiments, the glasses described herein are substantially free of at least one of arsenic, antimony, barium, strontium, bismuth, and their compounds. In other embodiments, the glasses may include up to about 0.5 mol % $Li_2O$, or up to about 5 mol % $Li_2O$ or, in some embodiments, up to about 10 mol % $Li_2O$. In other embodiments, these glasses are free of $Li_2O$.

In some embodiments, the glasses described herein, when ion exchanged, are resistant to introduction of flaws by sharp or sudden impact. Accordingly, these ion exchanged glasses exhibit Vickers crack initiation threshold of at least about 10 kilogram force (kgf) up to about 50 kgf. In certain embodiments, these glasses exhibit a Vickers crack initiation threshold of at least 20 kgf and, in some embodiments, at least about 30 kgf.

The glasses described herein may, in some embodiments, be down-drawable by processes known in the art, such as slot-drawing, fusion drawing, re-drawing, and the like, and have a liquidus viscosity of at least 130 kilopoise. In addition to those compositions listed hereinabove, various other ion exchangeable alkali aluminosilicate glass compositions may be used.

The strengthened glasses described herein are considered suitable for various two- and three-dimensional shapes and may be utilized in various applications, and various thicknesses are contemplated herein. In some embodiments, the glass article has a thickness in a range from about 0.1 mm up to about 1.5 mm. In some embodiments, the glass article has a thickness in a range from about 0.1 mm up to about 1.0 mm and, in certain embodiments, from about 0.1 mm up to about 0.5 mm.

Strengthened glass articles may also be defined by their central tension CT. In one or more embodiments, the strengthened glass articles described herein have a $CT\leq150$ MPa, or a $CT\leq125$ MPa, or $CT\leq100$ MPa. The central tension of the strengthened glass correlates to the frangible behavior of the strengthened glass article.

In another aspect, a method of making a strengthened glass article having at least one compressive stress layer extending from a surface of the strengthened glass article to a depth of compression DOC of at least about 125 μm is provided. The method includes, in some embodiments, a single ion exchange step in which an alkali aluminosilicate glass article is immersed in a first ion exchange bath at a temperature of greater than 400° C. for a time sufficient such that the compressive stress layer has a depth of compression of at least about 100 MPa and, in other embodiments, at least about 140 MPa and up to about 400 MPa after the ion exchange step.

Actual immersion times in the ion exchange bath may depend upon factors such as the temperature and/or composition of the ion exchange bath, the diffusivity of the cations within the glass, and the like. Accordingly, various time periods for ion exchange are contemplated as being suitable. In those instances in which potassium cations from the ion exchange bath are exchanged for sodium cations in the glass, the bath typically comprises potassium nitrate ($KNO_3$). Here, the ion exchange step, in some embodiments, may be conducted for a time of at least 5 hours. Longer ion exchange periods for the ion exchange step may correlate with larger sodium ion contents in the first ion exchange bath. in some embodiments, the desired sodium ion content in first ion exchange bath may be achieved, for example, by including at least about 30% by weight or, in some embodiments, at least about 40% by weight of a sodium compound such as sodium nitrate ($NaNO_3$) or the like in the first ion exchange bath. In some embodiments, the sodium compound accounts for about 40% to about 60% by weight of the first ion exchange bath. In an exemplary embodiment, the first ion exchange step is carried out at a temperature of about 440° C. or greater and, in some embodiments, up to about 500° C.

After the first ion exchange step is performed, the strengthened glass article may have a maximum compressive stress (CS) of at least about 100 MPa and, in other embodiments, at least 140 MPa and, in some embodiments, up to about 400 MPa. The first ion exchange step achieves a compressive layer depth/depth of compression DOC of about 100 μm to about 200 μm and, in some embodiments, about 140 μm to 200 μm after the first ion exchange step.

In some embodiments, a second ion exchange step may be conducted by immersing the alkali aluminosilicate glass article in a second ion exchange bath at a temperature of at least 350° C. up to about 450° C. for a time sufficient to produce the shallow steep segment with a depth $d_b$ (FIG. 3) of at least about 3 μm following the ion exchange step described hereinabove. In some embodiments, the second ion exchange bath differs in composition and/or temperature from the first ion exchange bath. The second ion exchange step achieves a compressive stress at the surface of at least about 400 MPa to about 1200 MPa.

The second ion exchange step is a relatively rapid ion exchange step that yields a "spike" of compressive stress near the surface of the glass as depicted in FIG. 3. In one or more embodiments, the second ion exchange step may be conducted for a time of up to about 30 minutes or, in other embodiments, up to about 15 minutes or, in some embodiments, in a range from about 10 minutes to about 60 minutes.

The second ion exchange step is directed to delivering a different ion to the alkali aluminosilicate glass article than the ion provided by the first ion exchange step. The composition of the second ion exchange bath therefore differs from the first ion exchange bath. In some embodiments, the second ion exchange bath comprises at least about 95% by weight of a potassium composition (e.g., $KNO_3$) that delivers potassium ions to the alkali aluminosilicate glass article. In a specific embodiment, the second ion exchange bath may comprise from about 98% to about 99.5% by weight of the potassium composition. While it is possible that the second ion exchange bath comprises only a potassium salt (or salts), the second ion exchange bath may, in further embodiments, comprise up to about 2% by weight or from about 0.5% to about 1.5% by weight of a sodium composition such as, for example, $NaNO_3$. In further embodiments, the temperature of the second ion exchange step may be 390° C. or greater.

Frangible behavior is characterized by at least one of: breaking of the strengthened glass article (e.g., a plate or sheet) into multiple small pieces (e.g., ≤1 mm); the number of fragments formed per unit area of the glass article; multiple crack branching from an initial crack in the glass article; violent ejection of at least one fragment to a specified distance (e.g., about 5 cm, or about 2 inches) from its original location; and combinations of any of the foregoing breaking (size and density), cracking, and ejecting behaviors. As used herein, the terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glass articles described herein, such external restraints are not used in determining the frangibility or frangible behavior of the glass articles.

Figure 4A:
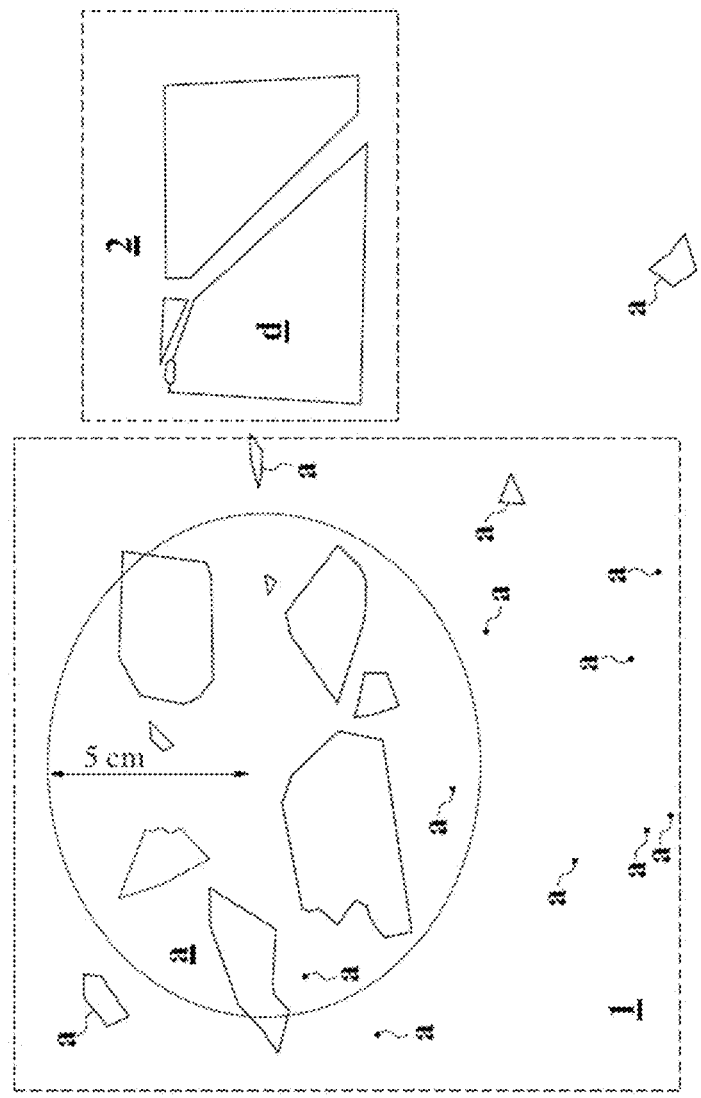
FIG. 4a is a graphical representation of a photograph showing strengthened glass articles 1) exhibiting frangible behavior upon fragmentation; and 2) exhibiting non-frangible behavior upon fragmentation.
Figure 4B:
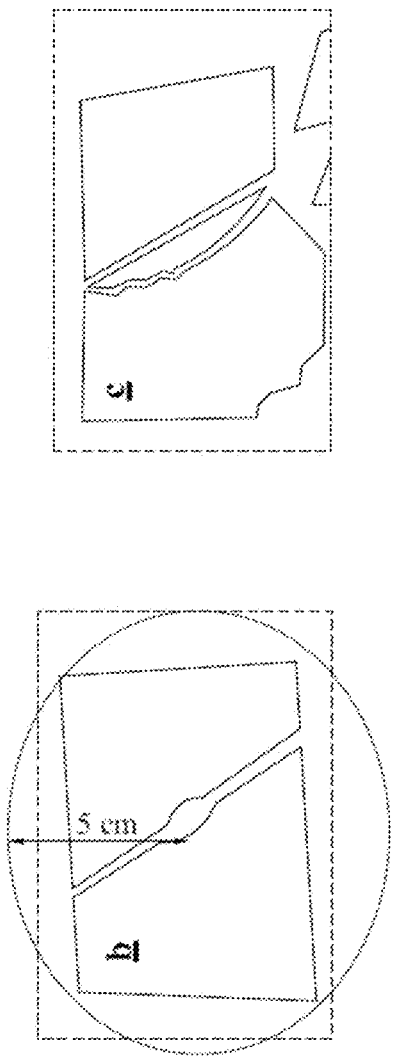
FIG. 4b is a graphical representation of a photograph showing strengthened glass sheets that exhibit non-frangible behavior upon fragmentation.

Examples of frangible behavior and non-frangible behavior of strengthened glass articles upon point impact with a scribe having a sharp tungsten carbide (WC) tip are shown in FIGS. 4a and 4b. The point impact test that is used to determine frangible behavior includes an apparatus that is delivered to the surface of the glass article with a force that is just sufficient to release the internally stored energy present within the strengthened glass article. That is, the point impact force is sufficient to create at least one new crack at the surface of the strengthened glass sheet and extend the crack through the compressive stress CS region (i.e., depth of layer) into the region that is under central tension CT. The impact energy needed to create or activate the crack in a strengthened glass sheet depends upon the compressive stress CS and depth of layer DOL of the article, and thus upon the conditions under which the sheet was strengthened (i.e., the conditions used to strengthen a glass by ion exchange). Otherwise, each ion exchanged glass plate shown in FIGS. 13a and 13b was subjected to a sharp dart indenter (e.g., a scribe with a sharp WC point) contact sufficient to propagate a crack into the inner region of the plate, the inner region being under tensile stress. The force applied to the glass plate was just sufficient to reach the beginning of the inner region, thus allowing the energy that drives the crack to come from the tensile stresses in the inner region rather than from the force of the dart impact on the outer surface. The degree of ejection may be determined, for example, by centering the glass sample on a grid, impacting the sample and measuring the ejection distance of individual pieces using the grid.

Referring to FIG. 4a, glass plate a can be classified as being frangible. In particular, glass plate a fragmented into multiple small pieces that were ejected, and exhibited a large degree of crack branching from the initial crack to produce the small pieces. Approximately 50% of the fragments are less than 1 mm in size, and it is estimated that about 8 to 10 cracks branched from the initial crack. Glass pieces were also ejected about 5 cm from original glass plate a, as seen in FIG. 4a. A glass article that exhibits any of the three criteria (i.e., multiple crack branching, ejection, and extreme fragmentation) described hereinabove is classified as being frangible. For example, if a glass exhibits excessive branching alone but does not exhibit ejection or extreme fragmentation as described above, the glass is still characterized as frangible.

Glass plates b, c, (FIG. 4b) and d (FIG. 4a) are classified as not frangible. In each of these samples, the glass sheet has broken into a small number of large pieces. Glass plate b (FIG. 4a), for example, has broken into two large pieces with no crack branching; glass plate c (FIG. 4b) has broken into four pieces with two cracks branching from the initial crack; and glass plate d (FIG. 14a) has broken into four pieces with two cracks branching from the initial crack. Based on the absence of ejected fragments (i.e., no glass pieces forcefully ejected more than 2 inches from their original location), no visible fragments that are less than or equal to 1 mm in size, and the minimal amount of observed crack branching, samples b, c, and d are classified as non-frangible or substantially non-frangible.

Based on the foregoing, a frangibility index (Table 1) can be constructed to quantify the degree of frangible or non-frangible behavior of a glass, glass ceramic, and/or a ceramic article upon impact with another object. Index numbers, ranging from 1 for non-frangible behavior to 5 for highly frangible behavior, have been assigned to describe different levels of frangibility or non-frangibility. Using the index, frangibility can be characterized in terms of numerous parameters: 1) the percentage of the population of fragments having a diameter (i.e., maximum dimension) of less than 1 mm ("Fragment size" in Table 1); 2) the number of fragments formed per unit area (in this instance, $cm^2$) of the sample ("Fragment density" in Table 1); 3) the number of cracks branching from the initial crack formed upon impact ("Crack branching" in Table 1); and 4) the percentage of the population of fragments that is ejected upon impact more than about 5 cm (or about 2 inches) from their original position ("Ejection" in Table 1).

TABLE 1

Criteria for determining the degree of frangibility and frangibility index.

| Degree of frangibility | Frangibility index | Fragment size (% ≤ 1 mm) | Fragment density (fragments/cm$^2$) | Crack branching | Ejection (% ≥ 5 cm) |
|---|---|---|---|---|---|
| High | 5 | >20 | >7 | >9 | >6 |
| Medium | 4 | $10 < n \leq 20$ | $5 < n \leq 7$ | $7 < n \leq 9$ | $4 < n \leq 6$ |
| Low | 3 | $5 < n \leq 10$ | $3 < n \leq 5$ | $5 < n \leq 7$ | $2 < n \leq 4$ |
| None | 2 | $0 < n \leq 5$ | $1 < n \leq 3$ | $2 < n \leq 5$ | $0 < n \leq 2$ |
|  | 1 | 0 | $n \leq 1$ | $n \leq 2$ | 0 |

A frangibility index is assigned to a glass article if the article meets at least one of the criteria associated with a particular index value. Alternatively, if a glass article meets criteria between two particular levels of frangibility, the article may be assigned a frangibility index range (e.g., a frangibility index of 2-3). The glass article may be assigned the highest value of frangibility index, as determined from the individual criteria listed in Table 1. In many instances, it is not possible to ascertain the values of each of the criteria, such as the fragmentation density or percentage of fragments ejected more than 5 cm from their original position, listed in Table 1. The different criteria are thus considered individual, alternative measures of frangible behavior and the frangibility index such that a glass article falling within one criteria level will be assigned the corresponding degree of frangibility and frangibility index. If the frangibility index based on any of the four criteria listed in Table 1 is 3 or greater, the glass article is classified as frangible.

Applying the foregoing frangibility index to the samples shown in FIGS. 13a and 13b, glass plate a fragmented into multiple ejected small pieces and exhibited a large degree of crack branching from the initial crack to produce the small pieces. Approximately 50% of the fragments are less than 1 mm in size and it is estimated that about 8 to 10 cracks branched from the initial crack. Based upon the criteria listed in Table 1, glass plate a has a frangibility index of between about 4-5, and is classified as having a medium-high degree of frangibility.

A glass article having a frangibility index of less than 3 (low frangibility) may be considered to be non-frangible or substantially non-frangible. Glass plates b, c, and d each lack fragments having a diameter of less than 1 mm, multiple branching from the initial crack formed upon impact and fragments ejected more than 5 cm from their original position. Glass plates b, c, and d are non-frangible and thus have a frangibility index of 1 (not frangible).

As previously discussed, the observed differences in behavior between glass plate a, which exhibited frangible behavior, and glass plates b, c, and d, which exhibited non-frangible behavior, in FIGS. 4a and 4b can be attributed to differences in central tension CT among the samples tested. The possibility of such frangible behavior is one consideration in designing various glass products, such as cover plates or windows for portable or mobile electronic devices such as cellular phones, entertainment devices, and the like, as well as for displays for information terminal (IT) devices, such as laptop computers. Moreover, the depth of the compression layer DOL and the maximum value of compressive stress CS that can be designed into or provided to a glass article are limited by such frangible behavior.

Accordingly, the strengthened glass articles described herein, in some embodiments, exhibit a frangibility index of less than 3 when subjected to a point impact sufficient to break the strengthened glass article. In other embodiments, non-frangible strengthened glass articles may achieve a frangibility index of less than 2 or less than 1.

The strengthened glass articles described herein demonstrate improved fracture resistance when subjected to repeated drop tests. The purpose of such drop tests is to characterize the performance of such glass articles in normal use as display windows or cover plates for handheld electronic devices such as cell phones, smart phones, and the like.

Figure 5A:
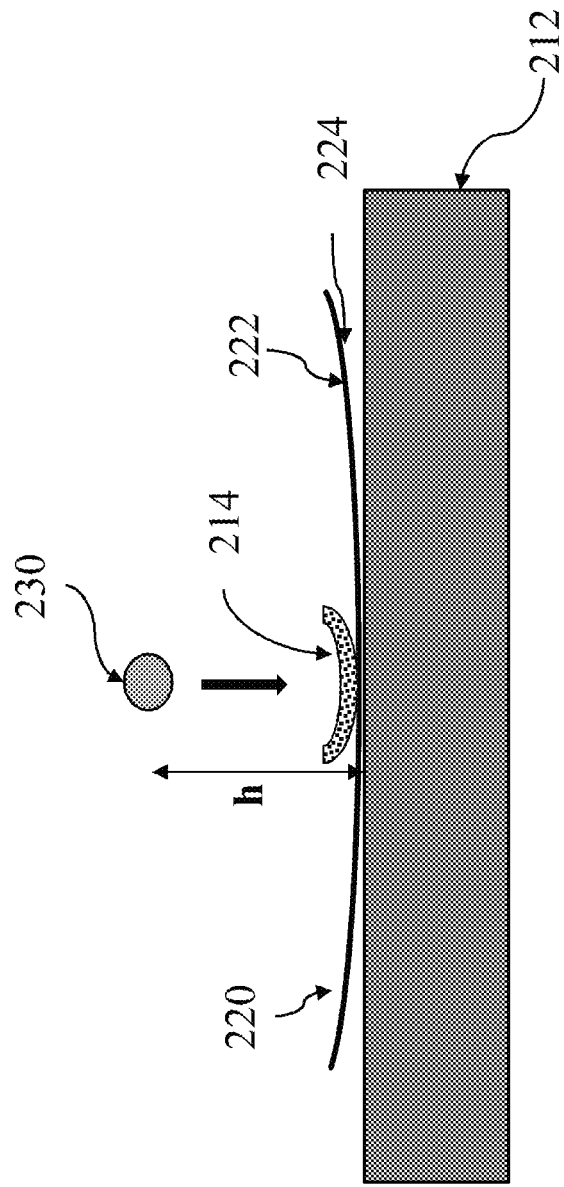
FIG. 5a is a schematic cross-sectional view of an embodiment of the apparatus that is used to perform the inverted ball on sandpaper (IBoS) test described in the present disclosure.

A typical ball drop test concept that is currently in use is shown in FIG. 5a. The ball drop test assembly 250 includes a solid, hard substrate 212 such as a granite slab or the like and a steel ball 230 of predetermined mass and diameter. A glass sample 220 is secured to the substrate 212, and a piece of sandpaper 214 having the desired grit is placed on the upper surface of the glass sample 220 opposite the substrate 212. The sandpaper 214 is placed on the glass sample 220 such that the roughened surface 214a of the sandpaper contacts the upper surface 222 of the glass sample 220. The steel ball 230 is allowed to fall freely from a predetermined height h onto the sandpaper 214. The upper surface 222 or compression face of the glass sample 220 makes contact with the roughened surface 214a of the sandpaper 214, introducing cracks into the surface of the upper surface/compression face 222. The height h may be increased incrementally until either a maximum height is reached or the glass sample fractures.

The ball drop test 250 described hereinabove does not represent the true behavior of glass when dropped onto and contacted by a rough surface. Instead, it is known that the face of the glass bends outward in tension, rather than inward in compression as shown in FIG. 5a.

Figure 5B:
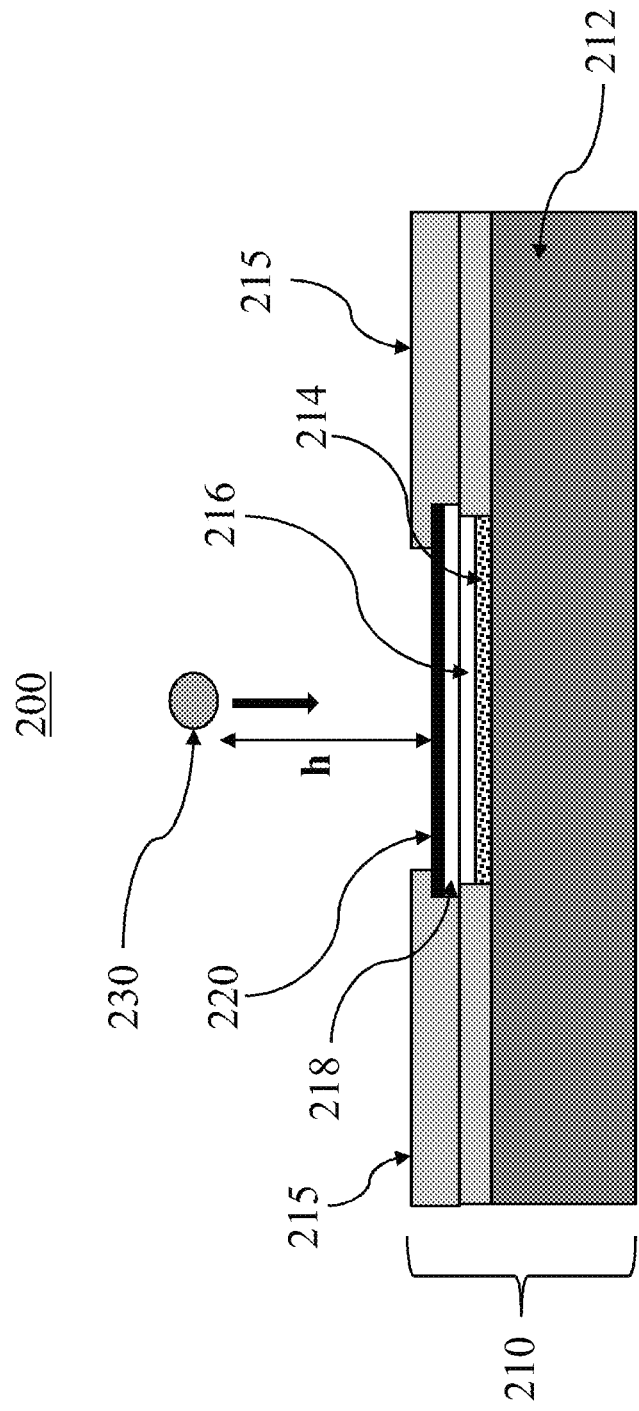
FIG. 5b is a schematic cross-sectional representation of the dominant mechanism for failure due to damage introduction plus bending that typically occurs in strengthened glass articles that are used in mobile or hand held electronic devices.
Figure 5C:
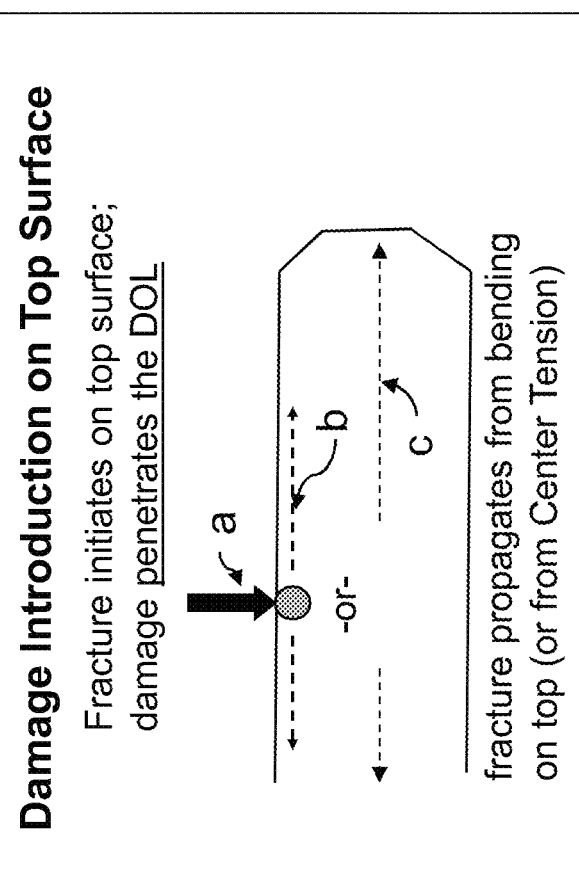
FIG. 5c is a schematic cross-sectional representation of the dominant mechanism for failure due to damage introduction plus bending that typically occurs in strengthened glass articles that are used in mobile or hand held electronic devices.

An inverted ball on sandpaper (IBoS) test is a dynamic component level test that mimics the dominant mechanism for failure due to damage introduction plus bending that typically occurs in strengthened glass articles that are used in mobile or hand held electronic devices, as schematically shown in FIG. 5c. In the field, damage introduction (a in FIG. 5c) occurs on the top surface of the glass. Fracture initiates on the top surface of the glass and damage either penetrates the compressive layer (b in FIG. 5c) or the fracture propagates from bending on the top surface or from center tension (c in FIG. 5c). The IBoS test is designed to simultaneously introduce damage to the surface of the glass and apply bending under dynamic load.

An IBoS test apparatus is schematically shown in FIG. 5b. Apparatus 200 includes a test stand 210 and a ball 230. Ball 230 is a rigid or solid ball such as, for example, a stainless steel ball, or the like. In one embodiment, ball 230 is a 4.2 gram stainless steel ball having diameter of 10 mm. The ball 230 is dropped directly onto the glass sample 218 from a predetermined height h. Test stand 210 includes a solid base 212 comprising a hard, rigid material such as granite or the like. A sheet 214 having an abrasive material disposed on a surface is placed on the upper surface of the solid base 212 such that surface with the abrasive material faces upward. In some embodiments, sheet 214 is sandpaper having a 30 grit surface and, in other embodiments, a 180 grit surface. Glass sample 218 is held in place above sheet 214 by sample holder 215 such that an air gap 216 exists between glass sample 218 and sheet 214. The air gap 216 between sheet 214 and glass sample 218 allows the glass sample 218 to bend upon impact by ball 230 and onto the abrasive surface of sheet 214. In one embodiment, the glass sample 218 is clamped across all corners to keep bending contained only to the point of ball impact and to ensure repeatability. In some embodiments, sample holder 214 and test stand 210 are adapted to accommodate sample thicknesses of up to about 2 mm. The air gap 216 is in a range from about 50 µm to about 100 µm. An adhesive tape 220 may be used to cover the upper surface of the glass sample to collect fragments in the event of fracture of the glass sample 218 upon impact of ball 230.

Various materials may be used as the abrasive surface. In a one particular embodiment, the abrasive surface is sandpaper, such as silicon carbide or alumina sandpaper, engineered sandpaper, or any abrasive material known to those of ordinary skill in the art for having comparable hardness and/or sharpness. In some embodiments, sandpaper having 30 grit, as it has a known range of particle sharpness, a surface topography more consistent than concrete or asphalt, and a particle size and sharpness that produces the desired level of specimen surface damage.

Figure 5D:
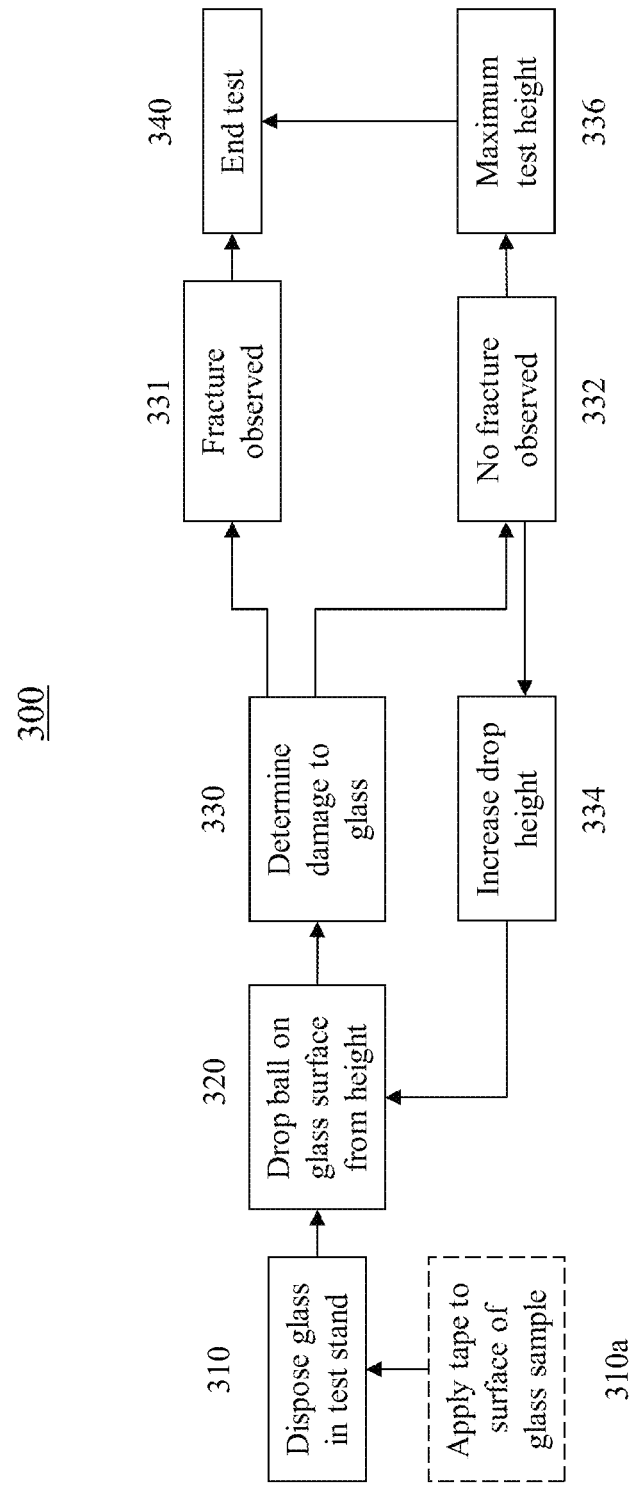
FIG. 5d is a flow chart for a method of conducting the IBoS test in the apparatus described herein.
Figure 6:
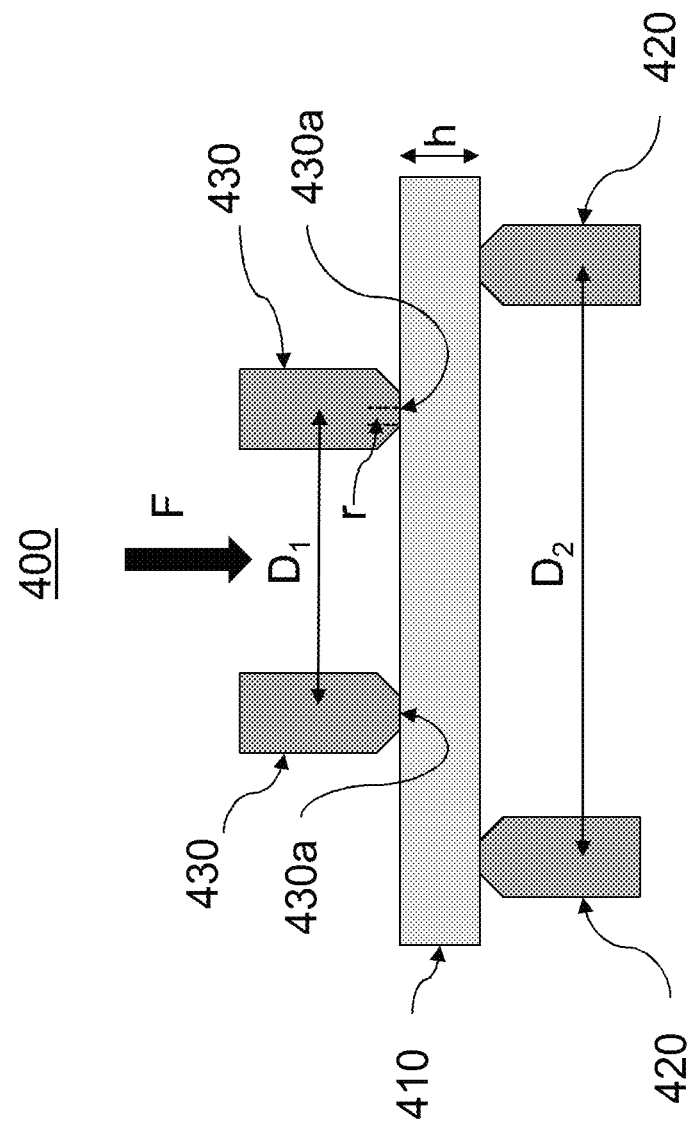
FIG. 6 is a schematic cross-sectional view of a ring on ring apparatus.

In one aspect, a method 300 of conducting the IBoS test using the apparatus 200 described hereinabove is shown in FIG. 5d. In Step 310, a glass sample (218 in FIG. 5d) is placed in the test stand 210, described previously and secured in sample holder 215 such that an air gap 216 is formed between the glass sample 218 and sheet 214 with an abrasive surface. Method 300 presumes that the sheet 214 with an abrasive surface has already been placed in test stand 210. In some embodiments, however, the method may include placing sheet 214 in test stand 210 such that the surface with abrasive material faces upward. In some embodiments (Step 310a), an adhesive tape 220 is applied to the upper surface of the glass sample 218 prior to securing the glass sample 218 in the sample holder 210.

In Step 320, a solid ball 230 of predetermined mass and size is dropped from a predetermined height h onto the upper surface of the glass sample 218, such that the ball 230 impacts the upper surface (or adhesive tape 220 affixed to the upper surface) at approximately the center (i.e., within 1 mm, or within 3 mm, or within 5 mm, or within 10 mm of the center) of the upper surface. Following impact in Step 320, the extent of damage to the glass sample 218 is determined (Step 330). As previously described hereinabove, herein, the term "fracture" means that a crack propagates across the entire thickness and/or entire surface of a substrate when the substrate is dropped or impacted by an object.

In test method 300, the sheet 218 with the abrasive surface may be replaced after each drop to avoid "aging" effects that have been observed in repeated use of other types (e.g., concrete or asphalt) of drop test surfaces.

Various predetermined drop heights h and increments are typically used in test method 300. The test may, for example, utilize a minimum drop height to start (e.g., about 10-20 cm). The height may then be increased for successive drops by either a set increment or variable increments. The test 300 is stopped once the glass sample 218 breaks or fractures (Step 331). Alternatively, if the drop height h reaches the maximum drop height (e.g., about 80 cm) without glass fracture, the drop test method 300 may also be stopped, or Step 320 may be repeated at the maximum height until fracture occurs.

In some embodiments, the IBoS test method 300 is performed only once on each glass sample 218 at each predetermined height h. In other embodiments, however, each sample may be subjected to multiple tests at each height.

If fracture of the glass sample 218 has occurred (Step 331 in FIG. 15d), the IBoS test 300 is ended (Step 340). If no fracture resulting from the ball drop at the predetermined drop height is observed (Step 332), the drop height is increased by a predetermined increment (Step 334)—such as, for example 5, 10, or 20 cm—and Steps 320 and 330 are repeated until either sample fracture is observed (331) or the maximum test height is reached (336) without sample fracture. When either Step 331 or 336 is reached, the test method 300 is ended.

When the ball is dropped onto the surface of the glass from a height of 100 cm, the damage resistance of the strengthened glasses described hereinabove may be expressed in terms of a "survival rate" when subjected to the inverted ball on sandpaper (IBoS) test described above. For example, a strengthened glass article is described as having a 60% survival rate when dropped from a given height when three of five identical (or nearly identical) samples (i.e., having approximately the same composition and, when strengthened, approximately the same CS and DOC or DOL) survive the IBoS drop test without fracture.

To determine the survivability rate of the strengthened glass article when dropped from a predetermined height using the IBoS test method and apparatus described hereinabove, at least five identical (or nearly identical) samples (i.e., having approximately the same composition and approximately the same CS and DOC or DOL) of the strengthened glass are tested, although larger numbers (e.g., 10, 20, 30, etc.) of samples may be subjected to testing to raise the confidence level of the test results. Each sample is dropped a single time from the predetermined height (e.g., 80 cm) and visually (i.e., with the naked eye) examined for evidence of fracture (crack formation and propagation across the entire thickness and/or entire surface of a sample. A sample is deemed to have "survived" the drop test if no fracture is observed after being dropped. The survivability rate is determined to be the percentage of the sample population that survived the drop test. For example, if 7 samples out of a group of 10 did not fracture when dropped from the predetermined height, the survivability rate of the glass would be 70%.

The strengthened glass articles described herein also demonstrate improved surface strength when subjected to abraded ring-on-ring (AROR) testing. The strength of a material is defined as the stress at which fracture occurs. The abraded ring-on-ring test is a surface strength measurement for testing flat glass specimens, and ASTM C1499-09 (2013), entitled "Standard Test Method for Monotonic Equibiaxial Flexural Strength of Advanced Ceramics at Ambient Temperature," serves as the basis for the ring-on-ring abraded ROR test methodology described herein. The contents of ASTM C1499-09 are incorporated herein by reference in their entirety. In one embodiment, the glass specimen is abraded prior to ring on ring testing with 90 grit silicon carbide (SiC) particles that are delivered to the glass sample using the method and apparatus described in Annex A2, entitled "abrasion Procedures," of ASTM C158-02 (2012), entitled "Standard Test Methods for Strength of Glass by Flexure (Determination of Modulus of Rupture). The contents of ASTM C158-02 and the contents of Annex 2 in particular are incorporated herein by reference in their entirety.

Prior to ring-on-ring testing a surface of the glass sample is abraded as described in ASTM C158-02, Annex 2, to normalize and/or control the surface defect condition of the sample using the apparatus shown in Figure A2.1 of ASTM C158-02. The abrasive material is sandblasted onto the sample surface at a load of 15 psi using an air pressure of 304 kPa (44 psi). After air flow is established, 5 cm³ of abrasive material is dumped into a funnel and the sample is sandblasted for 5 seconds after introduction of the abrasive material.

For the ring-on-ring test, a glass specimen having at least one abraded surface 412 is placed between two concentric rings of differing size to determine equibiaxial flexural strength (i.e., the maximum stress that a material is capable of sustaining when subjected to flexure between two concentric rings), as schematically shown in FIG. 19. In the abraded ring-on-ring configuration 400, the abraded glass specimen 410 is supported by a support ring 420 having a diameter $D_2$. A force F is applied by a load cell (not shown) to the surface of the glass specimen by a loading ring 430 having a diameter $D_1$.

The ratio of diameters of the loading ring and support ring $D_1/D_2$ may be in a range from about 0.2 to about 0.5. In some embodiments, $D_1/D_2$ is about 0.5. Loading and support rings 430, 420 should be aligned concentrically to within 0.5% of support ring diameter $D_2$. The load cell used for testing should be accurate to within ±1% at any load within a selected range. In some embodiments, testing is carried out at a temperature of 23±2° C. and a relative humidity of 40±10%.

For fixture design, the radius r of the protruding surface of the loading ring 430, h/2≤r≤3h/2, where h is the thickness of specimen 410. Loading and support rings 430, 420 are typically made of hardened steel with hardness $HR_c$>40. ROR fixtures are commercially available.

The intended failure mechanism for the ROR test is to observe fracture of the specimen 410 originating from the surface 430a within the loading ring 430. Failures that occur outside of this region—i.e., between the loading rings 430 and support rings 420—are omitted from data analysis. Due to the thinness and high strength of the glass specimen 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. AROR testing therefore focuses on peak load at failure as the measured response.

The strength of glass depends on the presence of surface flaws. However, the likelihood of a flaw of a given size being present cannot be precisely predicted, as the strength of glass is statistical in nature. A Weibull probability distribution is therefore generally used as a statistical representation of the data obtained.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass article, the glass article comprising a thickness tin a range from 0.1 mm to 1.0 mm, and a compressive region having a compressive stress $CS_s$, in a range from about 400 MPa to about 1200 MPa at a surface of the glass article, wherein the compressive region extends from the surface to a depth of compression DOC, wherein 0.12·t ≤DOC ≤ 0.22·t, and has a compressive stress profile, the compressive stress profile comprising:
   a. a first portion b extending from the surface to a depth $d_b$ below the surface and having a slope $m_b$; and
   b. a second portion c extending from about $d_c$ to the depth of compression DOC and having a slope $m_c$, wherein −0.4 MPa/μm ≥$m_c$≥−3.0 MPa/μm.

2. The glass article of claim 1, wherein the depth of compression DOC is in a range from about 95 μm to about 250 μm.

3. The glass article of claim 1, wherein the depth of compression DOC is in a range from about 100 μm to about 190 μm.

4. The glass article of claim 1, wherein the slope $m_c$ is in a range from about −0.7 MPa/μm to about −2.7 MPa/μm.

5. A glass article, the glass article comprising a thickness t and a compressive region having a compressive stress $CS_s$, in a range from about 400 MPa to about 1200 MPa at a surface of the glass article, wherein the compressive region extends from the surface to a depth of compression DOC, wherein 0.1·t≤DOC≤0.25·t, and has a compressive stress profile, the compressive stress profile comprising:
   a. a first portion b extending from the surface to a depth $d_b$ below the surface and having a slope $m_b$; and
   b. a second portion c extending from about $d_c$ to the depth of compression DOC and having a slope $m_c$ wherein the slope $m_c$ is in a range from about −1.5 MPa/μm to about −2.7 MPa/μm.

6. The glass article of claim 1, wherein the glass article comprises an alkali aluminosilicate glass.

7. The glass article of claim 6, wherein the alkali aluminosilicate glass comprises up to about 10 mol % $Li_2O$.

8. The glass article of claim 6, wherein the alkali aluminosilicate glass comprises at least about 4 mol % $P_2O_5$ and from 0 mol % to about 4 mol % $B_2O_3$, wherein 1.3<[($P_2O_5$+$R_2O$)/$M_2O_3$]<2.3, where $M_2O_3$=$Al_2O_3$+$B_2O_3$, and $R_2O$ is the sum of monovalent cation oxides present in the alkali aluminosilicate glass.

9. The glass article of claim 6, wherein the glass is lithium-free.

10. The glass article of claim 6, wherein the glass consists essentially of from about 40 mol % to about 70 mol % $SiO_2$; from about 11 mol % to about 25 mol % $Al_2O_3$; from about 4 mol % to about 15 mol % $P_2O_5$; from about 13 mol % to about 25 mol % $Na_2O$; from about 13 to about 30 mol % $R_xO$, wherein $R_xO$ is the sum of the alkali metal oxides, alkaline earth metal oxides, and transition metal monoxides present in the glass; from about 11 to about 30 mol % $M_2O_3$, where $M_2O_3$=$Al_2O_3$+$B_2O_3$; from 0 mol % to about 1 mol % $K_2O$; from 0 mol % to about 4 mol % $B_2O_3$, and 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br; and 1.3<[($P_2O_5$+$R_2O$)/$M_2O_3$]<2.3, where $R_2O$ is the sum of monovalent cation oxides present in the glass.

11. An electronic device comprising the glass article of claim 1.

12. The glass article of claim 5, wherein the depth of compression DOC is in a range from about 100 μm to about 190 μm.

13. The glass article of claim 5, wherein 0.12·t DOCS ≤0.224·t "and the thickness is in a range from 0.1 mm to about 1.0 mm".

14. The glass article of claim 5, wherein the glass article comprises an alkali aluminosilicate glass.

15. The glass article of claim 14, wherein the alkali aluminosilicate glass comprises up to about 10 mol % $Li_2O$.

16. The glass article of claim 14, wherein the alkali aluminosilicate glass comprises at least about 4 mol % $P_2O_5$ and from 0 mol % to about 4 mol % $B_2O_3$, wherein $1.3<[(P_2O_5+R_2O)/M_2O_3]<2.3$, where $M_2O_3=Al_2O_3+B_2O_3$, and $R_2O$ is the sum of monovalent cation oxides present in the alkali aluminosilicate glass.

17. The glass article of claim 14, wherein the glass consists essentially of from about 40 mol % to about 70 mol % $SiO_2$; from about 11 mol % to about 25 mol % $Al_2O_3$; from about 4 mol % to about 15 mol % $P_2O_5$; from about 13 mol % to about 25 mol % $Na_2O$; from about 13 to about 30 mol % $R_xO$ is the sum of the alkali metal oxides, alkaline earth metal oxides, and transition metal monoxides present in the glass; from about 11 to about 30 mol % $M_2O_3$, where $M_2O_3=Al_2O_3+B_2O_3$; from 0 mol % to about 1 mol % $K_2O$; from 0 mol % to about 4 mol % $B_2O_3$, and 3 mol % or less of one or more of $TiO_2$, MnO, $Nb_2O_5$, $MoO_3$, $Ta_2O_5$, $WO_3$, $ZrO_2$, $Y_2O_3$, $La_2O_3$, $HfO_2$, CdO, $SnO_2$, $Fe_2O_3$, $CeO_2$, $As_2O_3$, $Sb_2O_3$, Cl, and Br; and $1.3<[(P_2O_5+R_2O)/M_2O_3]<2.3$, where $R_2O$ is the sum of monovalent cation oxides present in the glass.

18. An electronic device comprising the glass article of claim 5.

* * * * *

UNITED STATES PATENT AND TRADEMARK OFFICE
CERTIFICATE OF CORRECTION

PATENT NO. : 10,640,420 B2
APPLICATION NO. : 16/182004
DATED : May 5, 2020
INVENTOR(S) : Jaymin Amin et al.

Page 1 of 2

It is certified that error appears in the above-identified patent and that said Letters Patent is hereby corrected as shown below:

On the Title Page

In Column 1, item (63), Related U.S. Application Data, Line 1, after "10,150,698." insert -- 14/926,425 Claims benefit of Provisional 62/0735252 Oct. 31, 2014 --, therefor.

On page 2, in Column 2, item (56), Other Publications, Line 23, delete "Opinoin" and insert -- Opinion --, therefor.

On page 2, in Column 2, item (56), Other Publications, Line 26, delete "Opinoin" and insert -- Opinion --, therefor.

On page 2, in Column 2, item (56), Other Publications, Line 29, delete "Opinoin" and insert -- Opinion --, therefor.

On page 2, in Column 2, item (56), Other Publications, Line 32, delete "Opinoin" and insert -- Opinion --, therefor.

On page 2, in Column 2, item (56), Other Publications, Line 35, delete "Opinoin" and insert -- Opinion --, therefor.

In the Claims

In Column 25, Line 64, Claim 1, delete "tin" and insert -- t in --, therefor.

In Column 25, Line 65, Claim 1, delete "$CS_s$," and insert -- $CS_s$ --, therefor.

In Column 26, Line 1, Claim 1, delete "0.12 ·t" and insert -- 0.12·t --, therefor.

In Column 26, Line 19, Claim 5, delete "$CS_s$," and insert -- $CS_s$ --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,640,420 B2

In Column 26, Line 23, Claim 5, delete "0.1 ·t" and insert -- 0.1·t --, therefor.

In Column 26, Line 26, Claim 5, delete "$m_h$;" and insert -- $m_b$; --, therefor.

In Column 26, Line 28, Claim 5, delete "$m_c$" and insert -- $m_c$, --, therefor.

In Column 26, Line 38, Claim 8, delete "<2.3," and insert -- ≤2.3, --, therefor.

In Column 26, Line 50, Claim 10, delete "11" and insert -- 11 mol % --, therefor.

In Column 26, Line 50, Claim 10, delete "11" and insert -- 11 mol % --, therefor.

In Column 27, Line 51, Claim 10, delete "$M_2O_3$,where" and insert -- $M_2O_3$, where --, therefor.

In Column 26, Line 56, Claim 10, delete "<2.3," and insert -- ≤2.3, --, therefor.

In Column 26, Lines 63-64, Claim 13, delete "0.12·t DOCS ≤0.224·t "and the thickness is in a range from 0.1 mm to 65 about 1.0 mm"." and insert -- 0.12·t≤DOC≤0.22·t and the thickness is in a range from 0.1 mm to 65 about 1.0 mm. --, therefor.

In Column 27, Line 6, Claim 16, delete "<2.3," and insert -- ≤2.3, --, therefor.

In Column 27, Line 13, Claim 17, delete "13" and insert -- 13 mol % --, therefor.

In Column 27, Line 14, Claim 17, delete "mol %" and insert -- mol % $R_xO$, wherein --, therefor.

In Column 27, Line 16, Claim 18, delete "11" and insert -- 11 mol % --, therefor.

In Column 27, Line 16, Claim 18, delete "$M_2O_3$,where" and insert -- $M_2O_3$, where --, therefor.

In Column 27, Lines 21-22, Claim 17, delete "$M_2O_3$]<2.3," and insert -- $M_2O_3$]≤2.3, --, therefor.